(12) United States Patent
Geinzer et al.

(10) Patent No.: US 10,886,742 B2
(45) Date of Patent: Jan. 5, 2021

(54) METHOD AND SYSTEM FOR PERFORMANCE MANAGEMENT OF AN ENERGY STORAGE DEVICE

(71) Applicant: The AES Corporation, Arlington, VA (US)

(72) Inventors: Jay Craig Geinzer, Glenwood, MD (US); John Christopher Shelton, Falls Church, VA (US); Brett Lance Galura, Falls Church, VA (US)

(73) Assignee: The AES Corporation, Arlington, VA (US)

( * ) Notice: Subject to any disclaimer, the term of this patent is extended or adjusted under 35 U.S.C. 154(b) by 921 days.

(21) Appl. No.: 14/362,856

(22) PCT Filed: Dec. 7, 2012

(86) PCT No.: PCT/US2012/068566
§ 371 (c)(1),
(2) Date: Jun. 4, 2014

(87) PCT Pub. No.: WO2013/086411
PCT Pub. Date: Jun. 13, 2013

(65) Prior Publication Data
US 2014/0336840 A1 Nov. 13, 2014

Related U.S. Application Data

(60) Provisional application No. 61/569,020, filed on Dec. 9, 2011.

(51) Int. Cl.
*H02J 3/28* (2006.01)
*H01M 10/44* (2006.01)
(Continued)

(52) U.S. Cl.
CPC ............... *H02J 3/28* (2013.01); *G05B 11/00* (2013.01); *H01M 10/44* (2013.01); *H02J 3/32* (2013.01);
(Continued)

(58) Field of Classification Search
None
See application file for complete search history.

(56) References Cited

U.S. PATENT DOCUMENTS

| 4,899,034 A | * | 2/1990 | Kadwell | G05D 23/1917 |
| | | | | 219/494 |
| 5,126,537 A | * | 6/1992 | Kadwell | G05D 23/1917 |
| | | | | 219/497 |

(Continued)

FOREIGN PATENT DOCUMENTS

| JP | 2004-343850 A | 12/2004 |
| KR | 10-2006-0067910 A | 6/2006 |
| WO | WO 2010/059139 A1 | 5/2010 |

OTHER PUBLICATIONS

Chiasson, J. and Vairamohan, B., "Estimating the State of Charge of a Battery", May 2005, IEEE Transactions on Control Systems Technology, vol. 13, No. 3.*

(Continued)

*Primary Examiner* — Mohammad Ali
*Assistant Examiner* — Kelvin Booker
(74) *Attorney, Agent, or Firm* — Morgan, Lewis & Bockius LLP

(57) ABSTRACT

Approaches for managing and maintaining a state of charge of an energy storage device by adjusting (biasing) responses to electrical grid operator commands to perform ancillary services are disclosed. In embodiments, methods and systems regulate a set point regulation in an energy system. In an embodiment, a method determines when the set point needs to be changed, calculates a new set point, and moves (Continued)

US 10,886,742 B2

Page 2 the output of the system from an old set point to the new set point at a defined ramp rate. The method then incorporates, as part of a set point algorithm, the capability to restore the energy storage device to a desirable state of charge (SOC). Embodiments implement Dynamic Bias, SOC and Signal Bias Range Maintaining, Operational Limits, and Fixed Signal Bias algorithms and perform Intelligent Algorithm Selection to manage and maintain the SOC of an energy storage device by biasing responses to grid operator commands.

27 Claims, 23 Drawing Sheets

(51) Int. Cl.
G05B 11/00 (2006.01)
H02J 3/32 (2006.01)
H02J 3/38 (2006.01)
H02J 11/00 (2006.01)

(52) U.S. Cl.
CPC .............. *H02J 3/382* (2013.01); *H02J 11/00* (2013.01); *Y02E 70/30* (2013.01)

(56) References Cited

U.S. PATENT DOCUMENTS

| | | | |
|---|---|---|---|
| 5,215,834 A * | 6/1993 | Reher | G01R 31/382 429/62 |
| 5,302,858 A * | 4/1994 | Folts | H02J 7/022 307/100 |
| 5,341,503 A * | 8/1994 | Gladstein | G01R 31/3648 320/136 |
| 5,583,416 A * | 12/1996 | Klang | H02J 7/0077 320/160 |
| 6,459,175 B1 * | 10/2002 | Potega | B60L 11/185 307/132 M |
| 6,501,250 B2 | 12/2002 | Bito et al. | |
| 6,850,252 B1 * | 2/2005 | Hoffberg | G06K 9/00369 348/E7.061 |
| 6,859,091 B1 * | 2/2005 | Nicholson | H02M 3/07 327/536 |
| 6,936,994 B1 * | 8/2005 | Gimlan | B60L 8/003 320/101 |
| 7,616,465 B1 * | 11/2009 | Vinciarelli | H02M 3/157 323/265 |
| 7,940,028 B1 * | 5/2011 | Hermann | H01M 16/006 320/151 |
| 9,214,710 B1 * | 12/2015 | Cowen | H02J 7/0054 |
| 9,753,440 B2 * | 9/2017 | Pratt | H01M 10/44 |
| 2001/0043050 A1 * | 11/2001 | Fisher, Jr. | H02J 7/0068 320/101 |
| 2004/0095020 A1 * | 5/2004 | Kernahan | H02M 3/157 307/35 |
| 2004/0095081 A1 * | 5/2004 | Kernahan | H05B 41/2827 315/307 |
| 2004/0095103 A1 * | 5/2004 | Kernahan | G05F 3/262 323/272 |
| 2004/0095106 A1 * | 5/2004 | Kernahan | G05F 3/262 323/282 |
| 2004/0095107 A1 * | 5/2004 | Kernahan | H02M 3/157 323/282 |
| 2004/0095108 A1 * | 5/2004 | Kernahan | H03K 19/0963 323/282 |
| 2004/0095109 A1 * | 5/2004 | Kernahan | H02M 3/157 323/282 |
| 2004/0095110 A1 * | 5/2004 | Kernahan | H02M 3/157 323/282 |
| 2004/0095111 A1 * | 5/2004 | Kernahan | H02M 3/157 323/282 |
| 2004/0095112 A1 * | 5/2004 | Kernahan | H02M 1/0845 323/282 |
| 2004/0095113 A1 * | 5/2004 | Kernahan | H02M 3/157 323/282 |
| 2004/0095114 A1 * | 5/2004 | Kernahan | H02M 3/157 323/282 |
| 2004/0095115 A1 * | 5/2004 | Kernahan | H02M 1/0845 323/282 |
| 2004/0095116 A1 * | 5/2004 | Kernahan | G06F 1/24 323/282 |
| 2004/0095117 A1 * | 5/2004 | Kernahan | H02M 3/157 323/282 |
| 2004/0095118 A1 * | 5/2004 | Kernahan | H02J 7/0065 323/282 |
| 2004/0095119 A1 * | 5/2004 | Kernahan | H02M 3/157 323/282 |
| 2004/0095120 A1 * | 5/2004 | Kernahan | H02M 1/0845 323/282 |
| 2004/0095121 A1 * | 5/2004 | Kernahan | H02M 3/156 323/283 |
| 2004/0095164 A1 * | 5/2004 | Kernahan | G11C 27/02 327/94 |
| 2004/0095263 A1 * | 5/2004 | Thomas | H02M 3/157 341/53 |
| 2004/0095264 A1 * | 5/2004 | Thomas | H02M 3/157 341/53 |
| 2004/0095266 A1 * | 5/2004 | Kernahan | H02M 3/157 341/165 |
| 2004/0135560 A1 * | 7/2004 | Kernahan | H02M 3/157 323/282 |
| 2005/0028520 A1 * | 2/2005 | Chertok | F02G 1/043 60/517 |
| 2005/0062456 A1 * | 3/2005 | Stone | H02J 7/0016 320/116 |
| 2005/0254272 A1 * | 11/2005 | Vinciarelli | H02M 3/157 363/65 |
| 2006/0125319 A1 | 6/2006 | King et al. | |
| 2006/0171182 A1 * | 8/2006 | Siri | H02M 3/33592 363/131 |
| 2007/0090810 A1 * | 4/2007 | Dickinson | H01M 2/1077 320/150 |
| 2008/0231284 A1 * | 9/2008 | Birke | B60L 3/12 324/426 |
| 2009/0179691 A1 * | 7/2009 | Tanzawa | G11C 16/30 327/536 |
| 2010/0008119 A1 | 1/2010 | O'Brien et al. | |
| 2010/0012406 A1 * | 1/2010 | Kressner | B60L 11/14 180/65.22 |
| 2010/0019726 A1 * | 1/2010 | Kumar | B60L 3/0046 320/125 |
| 2010/0090532 A1 * | 4/2010 | Shelton | H02J 3/32 307/46 |
| 2010/0305770 A1 * | 12/2010 | Bhowmik | H02J 7/0014 700/295 |
| 2010/0314942 A1 * | 12/2010 | Talkin | G06Q 50/06 307/41 |
| 2011/0006727 A1 * | 1/2011 | Blau | H01M 10/44 320/101 |
| 2011/0010158 A1 * | 1/2011 | Bridges | B60L 53/64 703/18 |
| 2011/0089760 A1 * | 4/2011 | Castelaz | H02J 4/00 307/25 |
| 2011/0106336 A1 * | 5/2011 | Eikeland | B60L 50/66 701/2 |
| 2011/0169447 A1 * | 7/2011 | Brown | B60L 3/0069 320/109 |
| 2011/0172837 A1 * | 7/2011 | Forbes, Jr. | G06Q 10/00 700/291 |
| 2011/0172839 A1 * | 7/2011 | Brown | B60L 3/0069 700/292 |
| 2011/0216451 A1 * | 9/2011 | Haines | B60L 3/0069 361/42 |
| 2011/0216452 A1 * | 9/2011 | Haines | H02H 3/00 361/42 |
| 2011/0216453 A1 * | 9/2011 | Haines | H02H 9/00 361/49 |
| 2011/0221276 A1 * | 9/2011 | Geinzer | H02J 3/32 307/66 |

(56) References Cited

U.S. PATENT DOCUMENTS

| | | | | |
|---|---|---|---|---|
| 2011/0245987 A1* | 10/2011 | Pratt | ............... | H01M 10/44 700/295 |
| 2011/0260544 A1* | 10/2011 | Imai | ............... | H02J 7/1423 307/66 |
| 2011/0273129 A1* | 11/2011 | Coe | ............... | H02J 7/007 320/101 |
| 2011/0276194 A1* | 11/2011 | Emalfarb | ............... | H02J 3/32 700/297 |
| 2011/0279085 A1* | 11/2011 | Shigemizu | ............... | H01M 10/441 320/117 |
| 2011/0302078 A1* | 12/2011 | Failing | ............... | B60L 3/00 705/39 |
| 2012/0053848 A1* | 3/2012 | Doi | ............... | H02J 3/32 702/24 |
| 2012/0056588 A1* | 3/2012 | Cai | ............... | H02J 3/32 320/128 |
| 2012/0107651 A1* | 5/2012 | Hotta | ............... | H01M 2/202 429/61 |
| 2012/0139486 A1* | 6/2012 | Holland | ............... | H02J 7/0054 320/109 |
| 2012/0206100 A1* | 8/2012 | Brown | ............... | B60L 3/0069 320/109 |
| 2012/0296482 A1* | 11/2012 | Steven | ............... | G06Q 50/06 700/291 |
| 2012/0323389 A1* | 12/2012 | Shelton | ............... | G06Q 50/06 700/295 |
| 2012/0323396 A1* | 12/2012 | Shelton | ............... | H02J 3/381 700/297 |
| 2013/0038292 A1* | 2/2013 | Barrett | ............... | G01R 31/367 320/134 |
| 2013/0134934 A1* | 5/2013 | Yano | ............... | H01M 10/441 320/109 |
| 2013/0154553 A1* | 6/2013 | Steele | ............... | B60L 11/182 320/108 |
| 2013/0204443 A1* | 8/2013 | Steven | ............... | G06Q 10/00 700/286 |
| 2013/0217409 A1* | 8/2013 | Bridges | ............... | B60L 11/1842 455/456.1 |
| 2013/0245847 A1* | 9/2013 | Steven | ............... | G06Q 10/00 700/291 |
| 2013/0346139 A1* | 12/2013 | Steven | ............... | G06Q 10/06314 705/7.24 |
| 2014/0018969 A1* | 1/2014 | Forbes, Jr. | ............... | H02J 3/32 700/295 |
| 2014/0035371 A1* | 2/2014 | Weir | ............... | H02J 4/00 307/36 |
| 2014/0039709 A1* | 2/2014 | Steven | ............... | G06Q 10/06 700/291 |
| 2014/0039965 A1* | 2/2014 | Steven | ............... | G06Q 10/06315 705/7.25 |
| 2014/0084687 A1* | 3/2014 | Dent | ............... | H02M 1/32 307/26 |
| 2014/0304025 A1* | 10/2014 | Steven | ............... | G06Q 10/06314 705/7.24 |
| 2016/0363948 A1* | 12/2016 | Steven | ............... | G05F 1/66 |
| 2017/0222437 A1* | 8/2017 | Pratt | ............... | H02J 1/00 |
| 2018/0026550 A1* | 1/2018 | Dent | ............... | H02M 1/36 363/56.01 |

OTHER PUBLICATIONS

Lambert, T.; Gilman, P. and Lilienthal, P., "Integration of Alternative Sources of Energy—Chapter 15: Micropower System Modeling with Homer", 2006, John Wiley and Sons, Inc.*

Markel, T. and Simpson, A., "Plug-In Hybrid Electric Vehicle Energy Storage System Design", May 17-19, 2006, NREL/CP-540-39614.*

International Search Report (PCT/ISA/210) dated Mar. 15, 2013, by the Korean Patent Office as the International Searching Authority for International Application No. PCT/US2012/068566.

Office Action dated Jun. 6, 2014, by the Chilean Patent Office in the Chilean Patent Application No. 1491-14, and an English Translation of the Office Action. (21 pages).

* cited by examiner

METHOD AND SYSTEM FOR PERFORMANCE MANAGEMENT OF AN ENERGY STORAGE DEVICE

CROSS-REFERENCE TO RELATED APPLICATIONS

The present application claims the benefit of U.S. Provisional Appl. No. 61/569,020 entitled "Frequency Responsive Charge Sustaining Control of Electricity Storage Systems for Ancillary Services on an Electrical Power Grid," filed Dec. 9, 2011 which is incorporated by reference herein in its entirety. The present disclosure describes modifications to the operation of power plants and energy services in electrical power grid systems. Examples of such power plants, energy services, and electrical power grids are described in U.S. application Ser. No. 12/248,106 entitled "Frequency Responsive Charge Sustaining Control Of Electricity Storage Systems For Ancillary Services On An Electrical Power Grid," now U.S. Pat. No. 7,839,027, U.S. application Ser. No. 12/722,271 entitled "Regulation of Contribution of Secondary Energy Sources to Power Grid," filed Mar. 11, 2010, and U.S. application Ser. No. 13/527,290 entitled "Hybrid Electric Generating Power Plant That Uses a Combination of Real-Time Generation Facilities and Energy Storage System," filed Jun. 19, 2012. These prior applications are incorporated by reference herein in their entireties.

FIELD OF THE DISCLOSURE

The present invention is directed to systems and methods for providing generation services on a power grid and, more particularly, to controlling energy storage systems in an electrical power grid.

BACKGROUND

A variety of services must be provided in order to safely and reliably operate an Electrical Power Grid. Energy is the most well-known of these, but it is also necessary to regulate the frequency and the voltage of the power on an electrical grid, to provide various types of reserve generation in case of unforeseen problems, and to maintain a capability to restart the generators connected to the grid in the case of a system-wide blackout. Certain types of generation, including renewable power generation sources such as solar and wind generation may require special forms of regulation in order to minimize the effect of their intermittent nature on grid stability. These other, lesser-known services are known as 'Ancillary Services' in the industry.

Grid operators are responsible for providing these services themselves or for contracting with other entities for these services. In either case the grid operator must establish a set of Minimum Technical Requirements (MTRs) that must be met by the service provider in order to ensure that these services will provide the function they are intended to provide. These MTRs will typically include some sort of test that the service provider must pass in order to begin providing these services and an ongoing monitoring program to make sure that the service provider continues to provide these services in a safe, efficient and reliable fashion. Failure to meet these MTRs may result in the service provider not being allowed to provide the service. MTRs tend to be unique to each grid/grid operator, reflecting the fact that equipment and operations issues are different for each system. MTRs can be established by regional grid operators, Independent System Operators (ISOs), Regional Transmission Organizations (RTOs), such as, but not limited to, the New York ISO (NYISO) responsible for managing the New York state power grid, the Electric Reliability Council of Texas (ERCOT), the Pennsylvania-New Jersey-Maryland (PJM) Interconnection LLC, which is the grid operator for the Mid-Atlantic States, the Puerto Rico Electric Power Authority (PREPA), as well as power pools for other geographic areas.

Energy storage devices can be used to provide the ancillary services that regulate the quality of electricity supply. The process of providing these services involves receiving a signal from a grid operator and responding to that signal by either withdrawing or adding power to the transmission system. In the process of providing these services, the energy storage device can occasionally overheat, approach full, approach empty, or encounter some other condition that might impair the storage device's ability to continue providing services. The problem is how to bias the response to the signal from the grid operator without violating the grid operator's MTRs so as to allow the energy storage device to get the highest performance score it is capable of achieving.

Accordingly, what is needed are methods and systems that enable energy device operators to bias responses to signals from grid operators without violating applicable MTRs so as to allow an energy storage device to obtain the highest performance score it is capable of achieving without unduly sacrificing the device's ability to continue providing services, its longevity, or voiding its manufacturer warranty.

BRIEF SUMMARY

The present disclosure is directed to apparatus, systems, computer readable media and methods for managing and maintaining the state of charge of an energy storage device by adjusting (biasing) the response to grid operator commands to perform ancillary services. Embodiments do this in conjunction with performing certain paid ancillary services. Other algorithms may limit this biasing to maintain acceptable tolerances.

Exemplary algorithms disclosed herein are applicable to certain ancillary services that may be provided by regional grid operators, Independent System Operators (ISOs), Regional Transmission Organizations (RTOs), and power pools. The specific services that are supplied can include, but are not limited to, frequency regulation and the regulation of intermittent renewables. Certain exemplary algorithms disclosed herein are designed to meet the MTRs of these jurisdictions for these services while also controlling the state of charge (SOC) and temperature of the energy storage device.

Embodiments described herein are directed to systems and methods for carrying out and implementing the following technical solutions:

Dynamic Bias Algorithm (polynomial)—Controls a SOC of an energy storage device while providing frequency regulation or intermittent renewable regulation services in power pools or regions. According to an embodiment, the bias is based on the difference between the current SOC and the desired SOC. Embodiments of the Dynamic Bias Algorithm invoke polynomial functions that can be dynamically adjusted based on signal characteristics. In one embodiment, the polynomial function is a $7^{th}$ order polynomial function.

Set Point Autopilot Algorithm (wind ramp)—Controls a rate of change of the output of an intermittent resource so that other regulation devices on the grid can compensate for these changes and maintain system stability. An embodiment of the Set Point Autopilot Algorithm also uses the inherent variability of the output of an intermittent resource to control the SOC of an energy storage device. One embodiment of this algorithm can be used to control intermittent renewable output on any grid in any region or geographic area. The rate of change of output can be either an increase (i.e., ramp up) or a decrease (i.e., ramp down), of power output of an intermittent energy resource or source.

Fixed Signal Bias Algorithm—Controls a SOC of an energy storage device while providing frequency regulation services in a market such as a geographic region or state. For example, a system can be configured to implement an embodiment of the Fixed Signal Bias Algorithm to control the SOC of an energy storage device to comply with MTRs of an ISO or RTO. According to an embodiment, an overall error introduced by the biasing algorithm is kept within a tolerance as established by a system operator.

Signal Bias Range Maintaining Algorithm—Controls a SOC of an energy storage device while providing frequency regulation services in a market, such as, but not limited to, New York, by keeping the response within a desired range based on recent historical regulation signals, as specified by the system operator. In an embodiment, a system is configured to implement a version of the Signal Bias Range Maintaining Algorithm to keep the response within a desired range based on recent historical regulation signals specified by an ISO or an RTO.

State of Charge Range Maintaining Algorithm—Controls a SOC of an energy storage device to be within desired operational limits as specified by the system operator while providing frequency regulation services in a market such as New York.

Operational Limits Algorithm—Controls a response of an energy storage device to an incoming signal based on operational limits (such as temperature, ramp rate, etc.) which may be for the purpose of managing usage based on warranty parameters, safety thresholds, consumables or other operational parameters as deemed appropriate by the operator of the energy storage device. One such operator of energy storage devices is the AES Corporation (AES).

Intelligent Algorithm Selection—Exemplary embodiments include a system and technical approach for incorporating a number of different algorithms in a control system and selecting the best, or most optimal, algorithm to serve the current signal given a current state of an energy storage device.

BRIEF DESCRIPTION OF THE DRAWING/FIGURES

Exemplary embodiments are best understood from the following detailed description when read in conjunction with the accompanying drawings. It is emphasized that, according to common practice, the various features of the drawings are not to scale. On the contrary, the dimensions of the various features may be arbitrarily expanded or reduced for clarity. Included in the drawings are the following figures.

Figure 13:
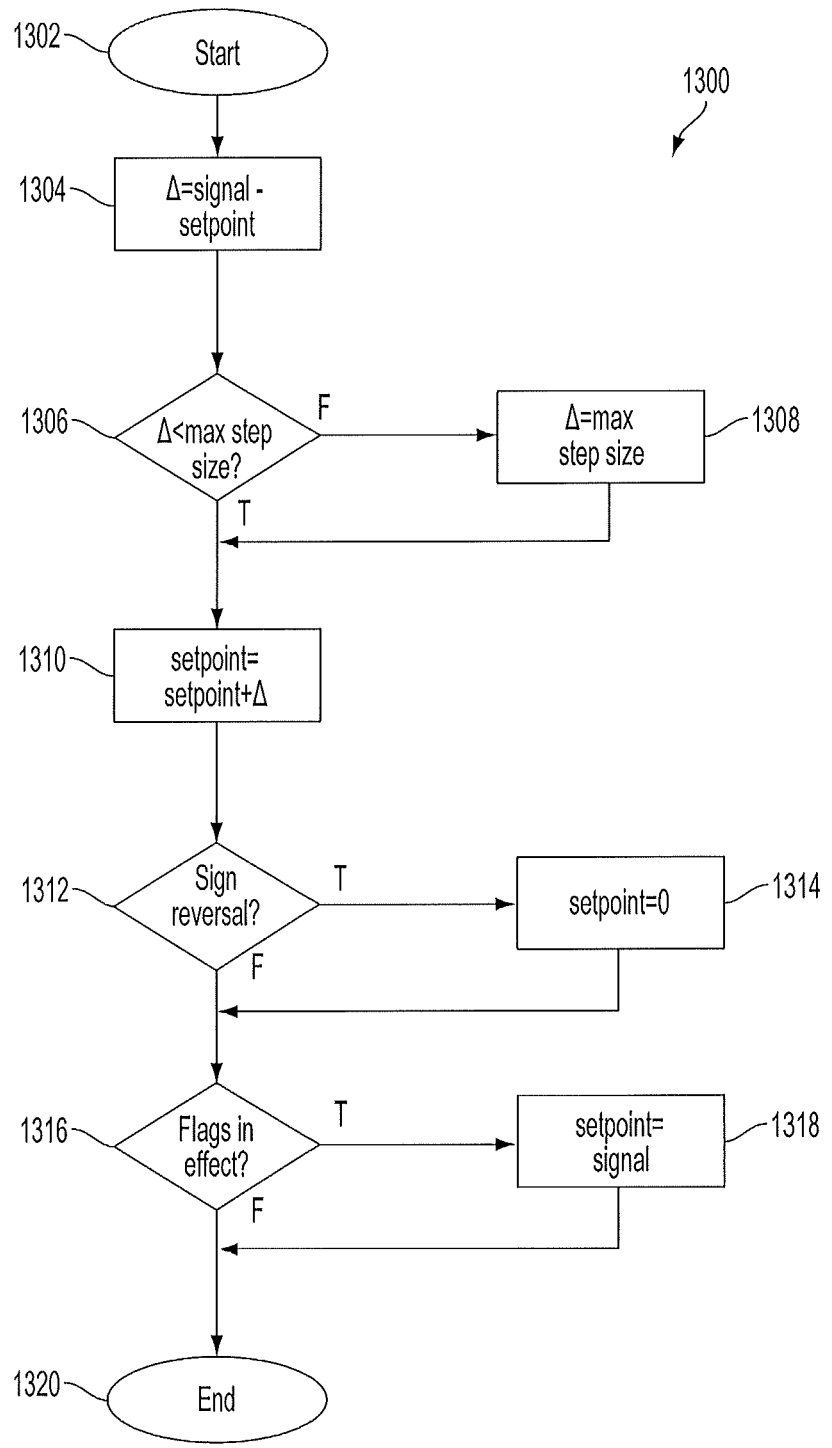
Figure 14:
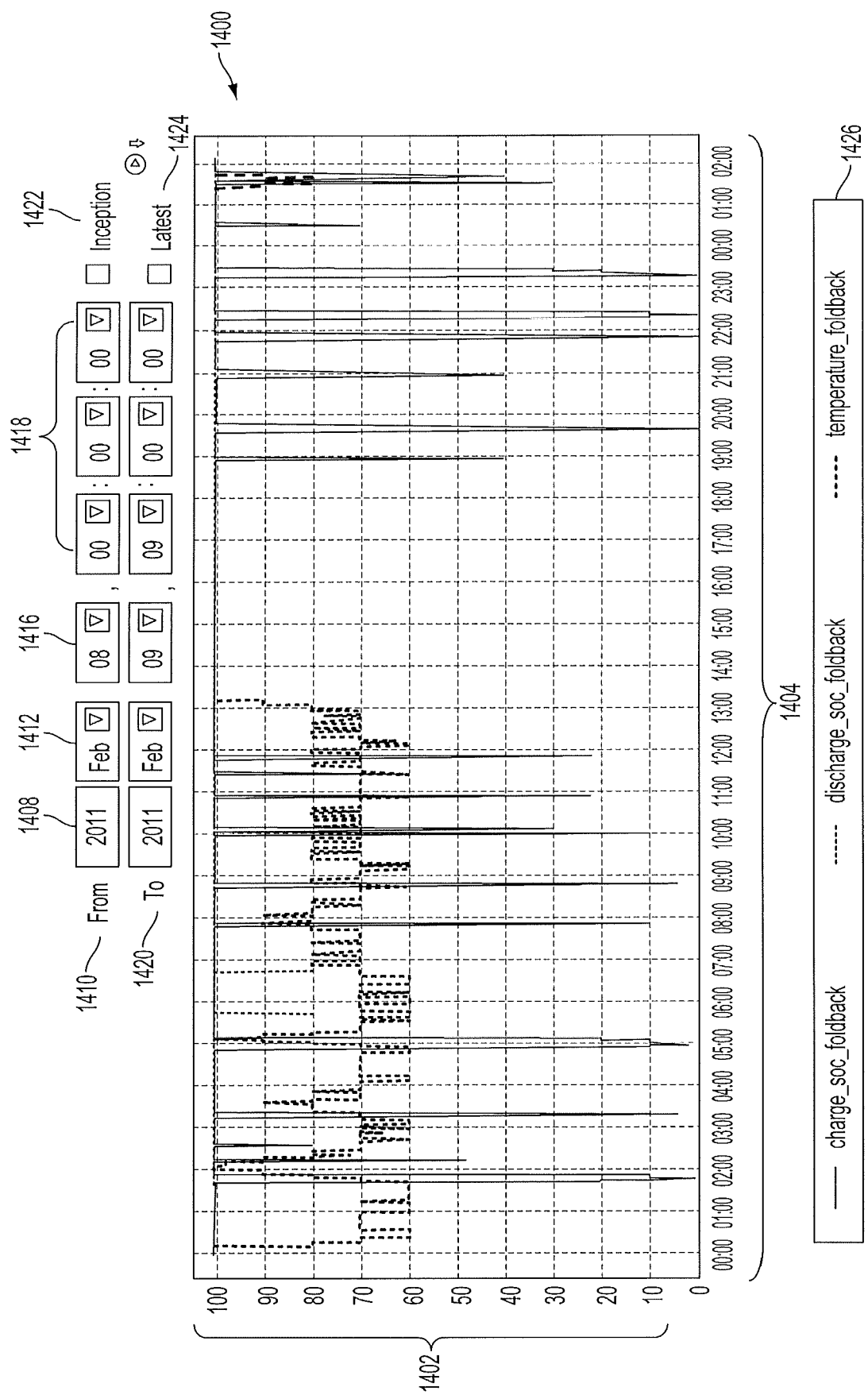
Figure 15:
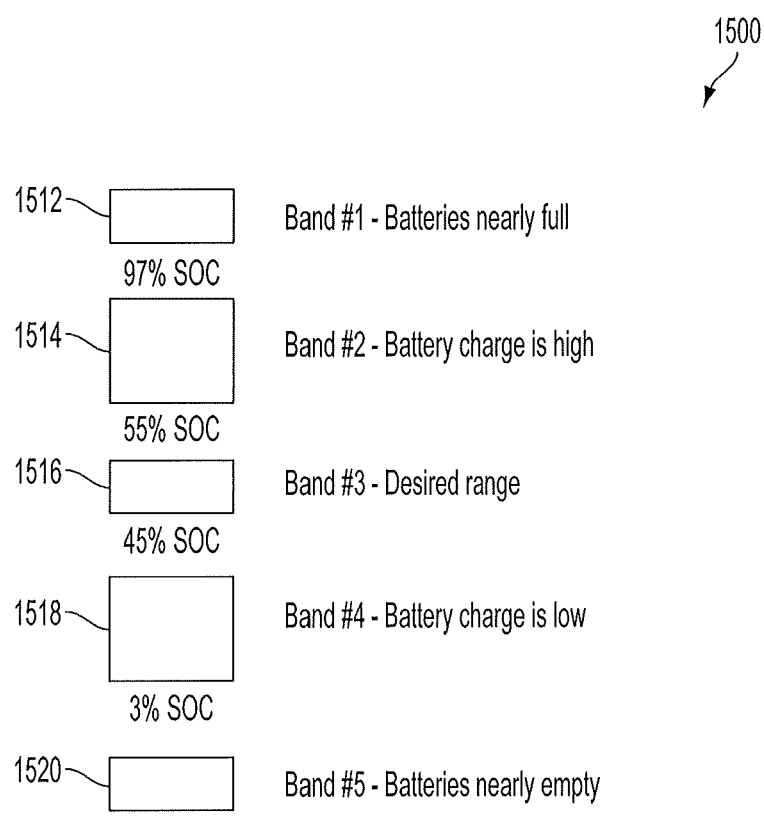
Figure 16:
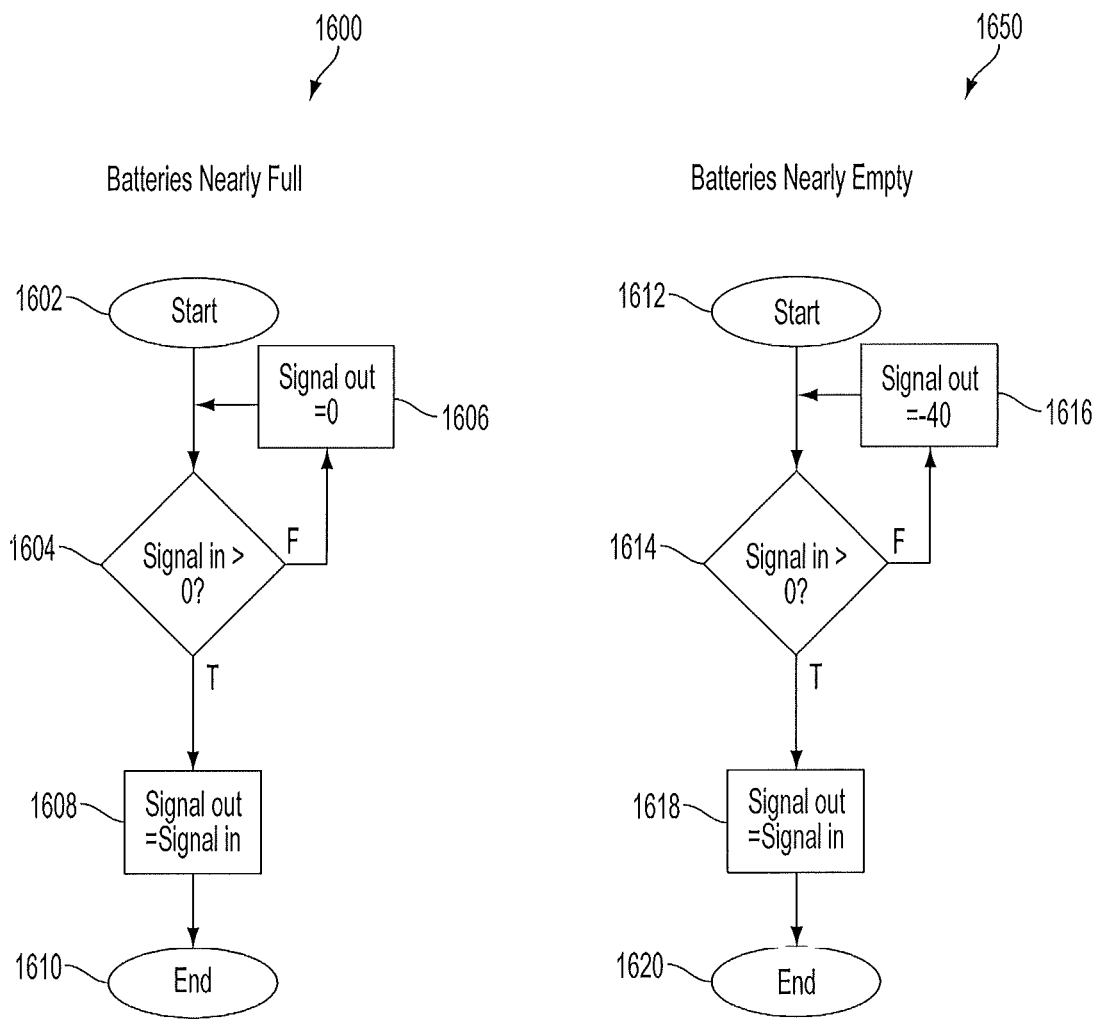
Figure 17:
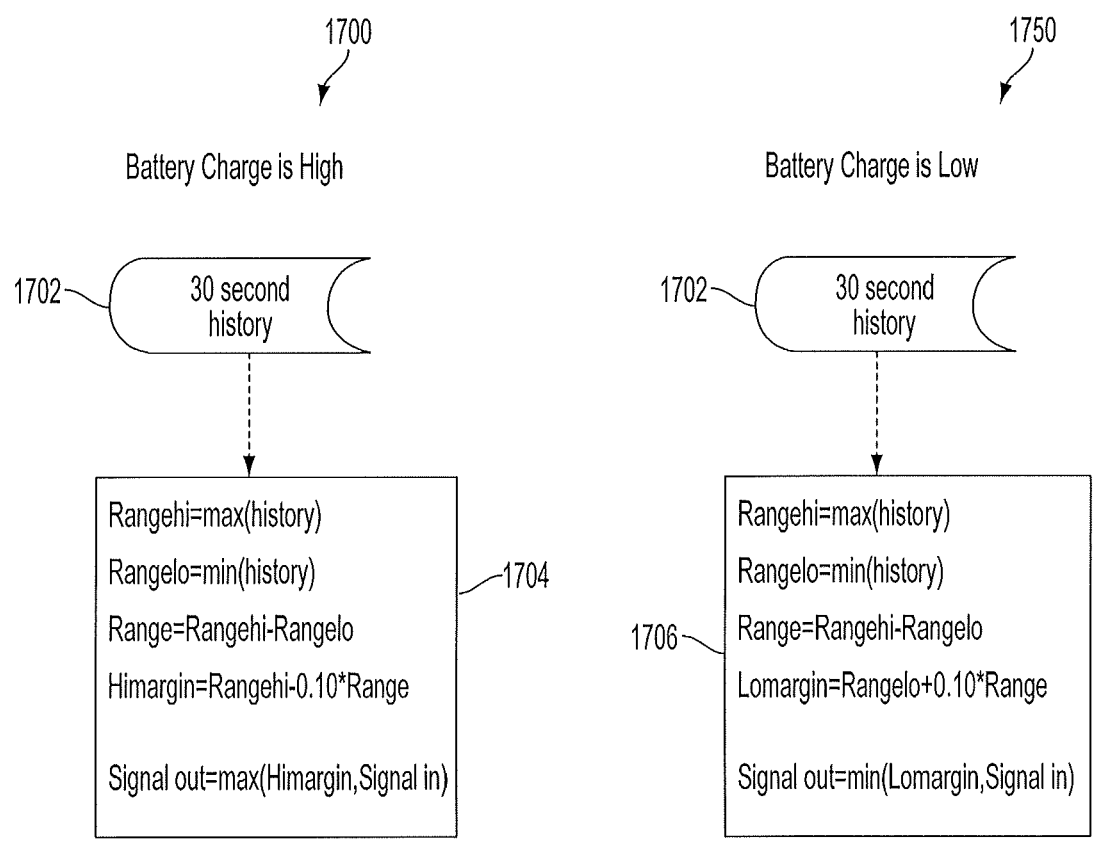
Figure 18:
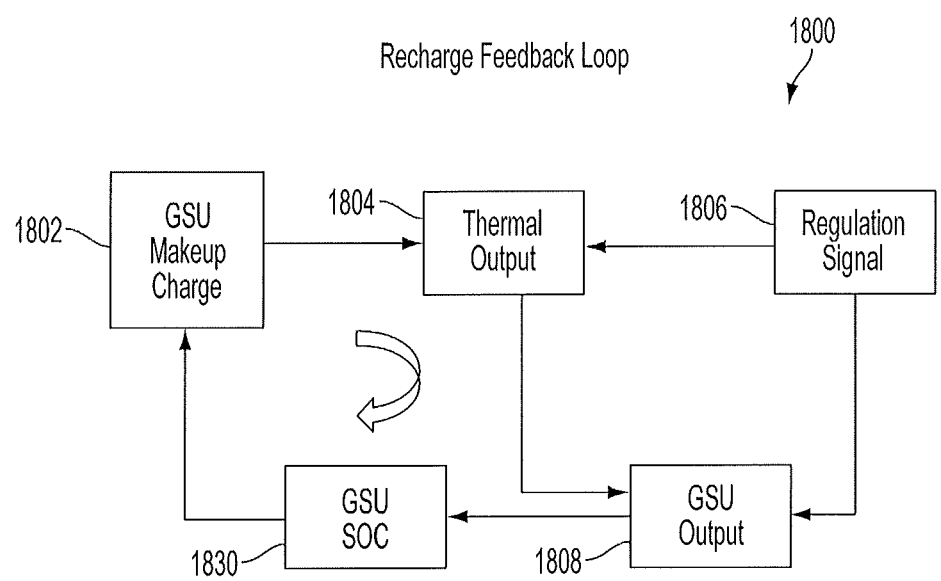
Figure 19:
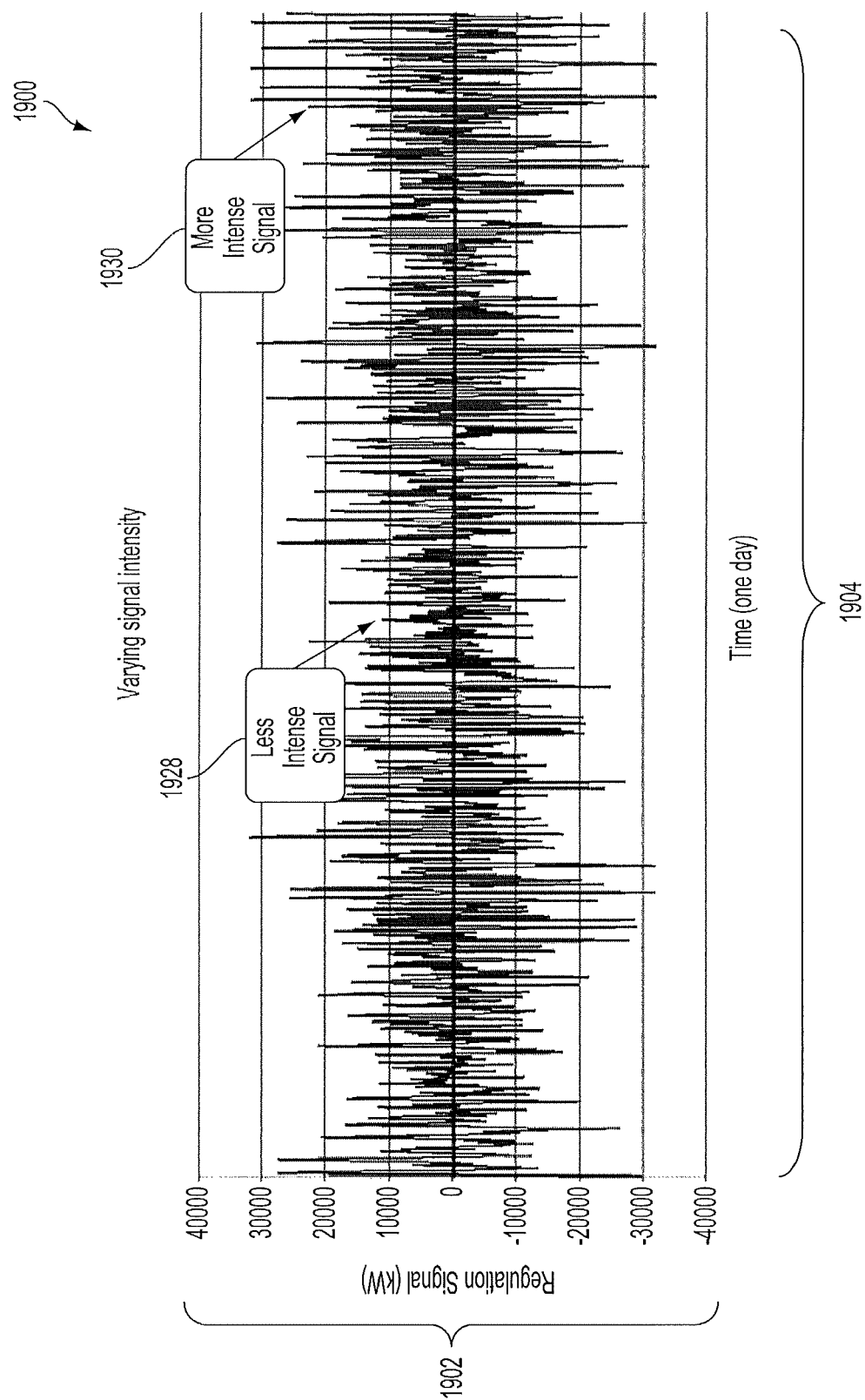
Figure 20:
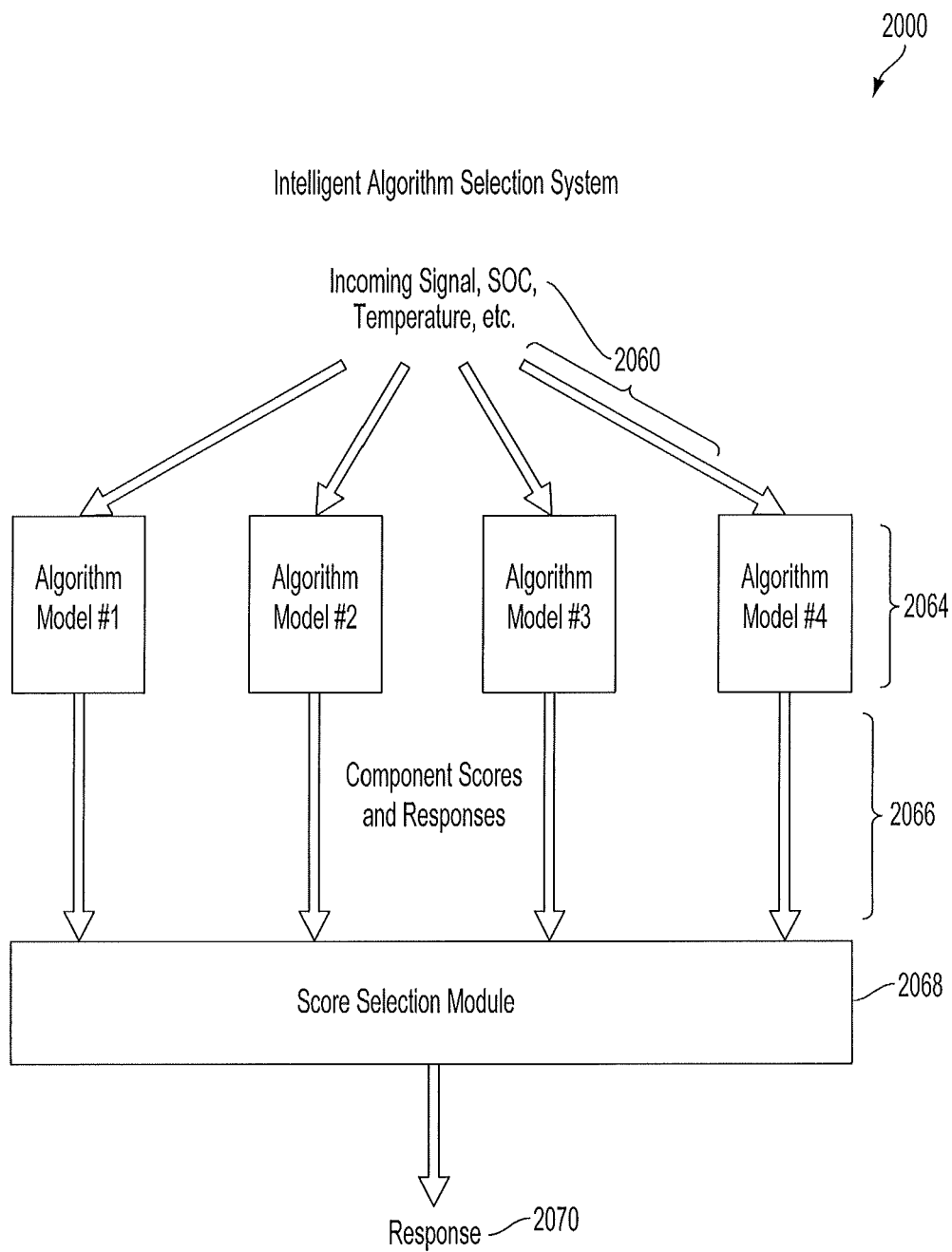
Figure 21:
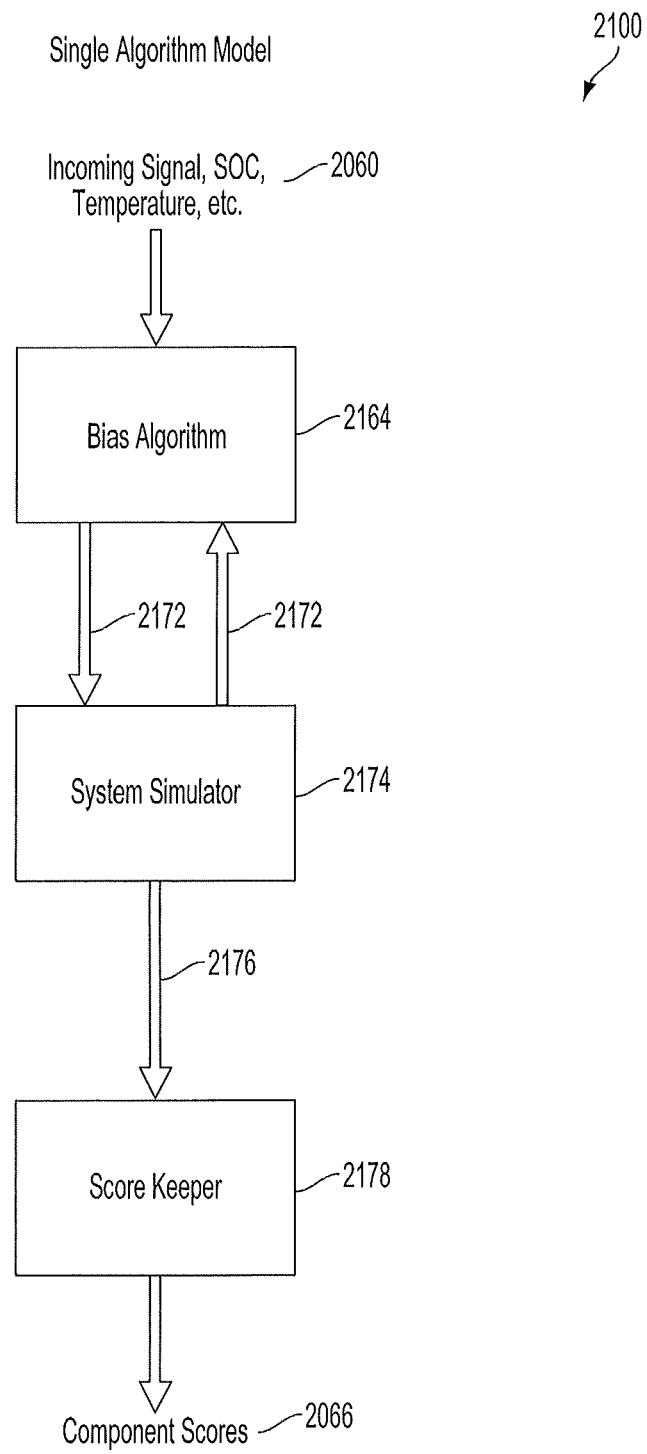
Figure 22:
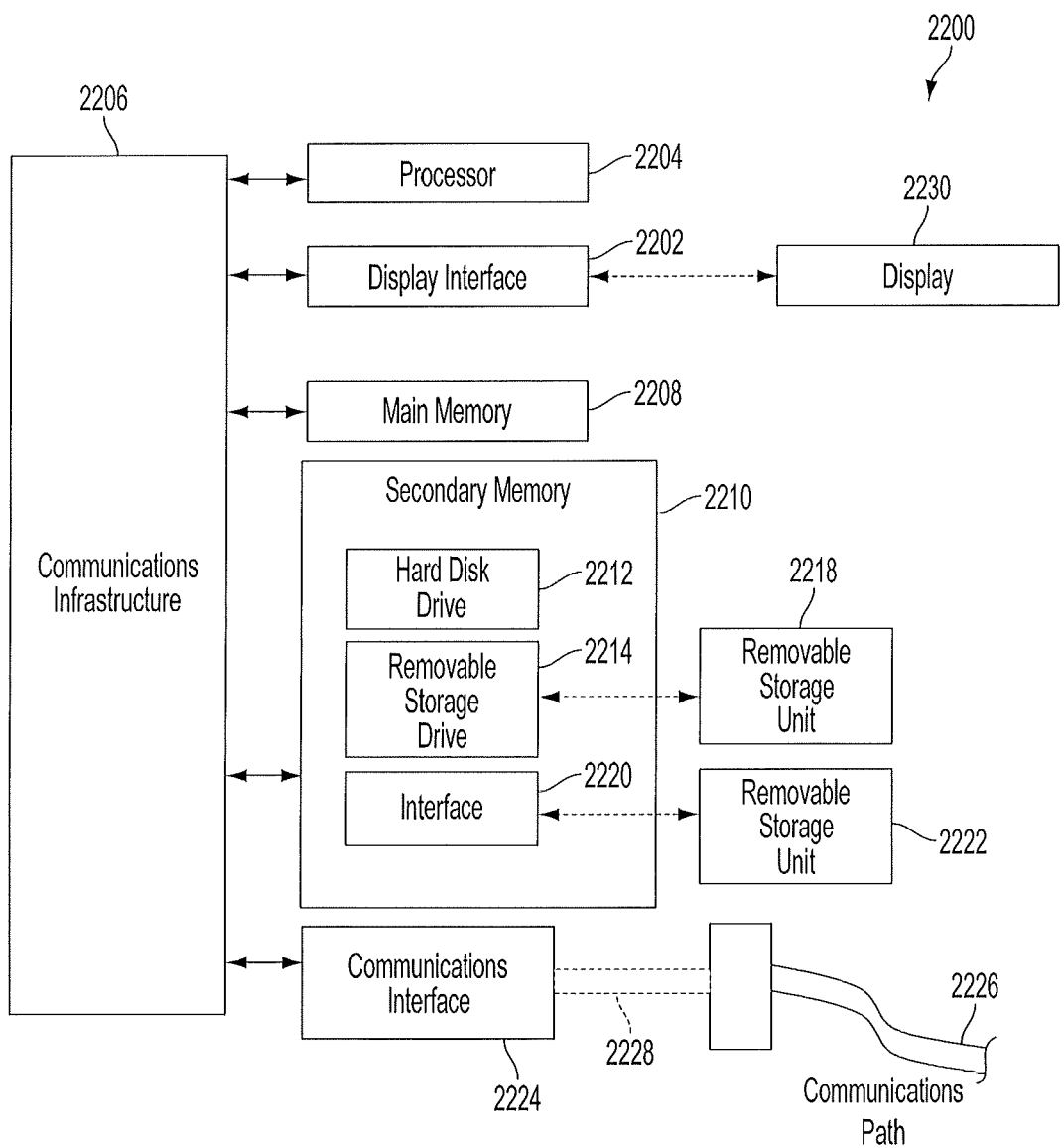

FIG. 13 a flowchart illustrating steps for implementing an Operational Limits Algorithm, in accordance with exemplary embodiments;

FIG. 14 depicts an exemplary graphical user interface for displaying charge derates and foldbacks, in accordance with exemplary embodiments;

FIG. 15 depicts bands of a state of charge of batteries and incoming regulation signals used to calculate a revised regulation signal that better meets user-defined objectives, in accordance with exemplary embodiments;

FIG. 16 provides flowcharts depicting steps for handling 'Battery Full' and 'Battery Nearly Empty' conditions, in accordance with exemplary embodiments;

FIG. 17 provides flowcharts depicting control logic for handling 'High Battery Charge' and 'Low Battery Charge' conditions, in accordance with exemplary embodiments;

FIG. 18 is a block diagram depicting a recharge feedback loop for responding to regulation signal according to a specified ramp rate and restoring a Generator step-up (GSU) transformer of a hybrid power plant to a desired state of charge, in accordance with an exemplary embodiment;

FIG. 19 is a flowchart illustrating a method for controlling the output of an energy storage device so that system temperatures remain in an acceptable range, in accordance with exemplary embodiments;

FIG. 20 is a block diagram showing the major components of an Intelligent Algorithm Selection system, in accordance with exemplary embodiments;

FIG. 21 is a block diagram showing the major subcomponents of an algorithm model that is a component of an Intelligent Algorithm Selection system, in accordance with exemplary embodiments; and FIG. 22 is a diagram of an exemplary computer system in which embodiments of the present disclosure can be implemented.

DETAILED DESCRIPTION

The present disclosure is directed to methods and systems for carrying out the following embodiments, which are described herein with reference to various algorithms, procedures, and technical solutions.

Figure 1:
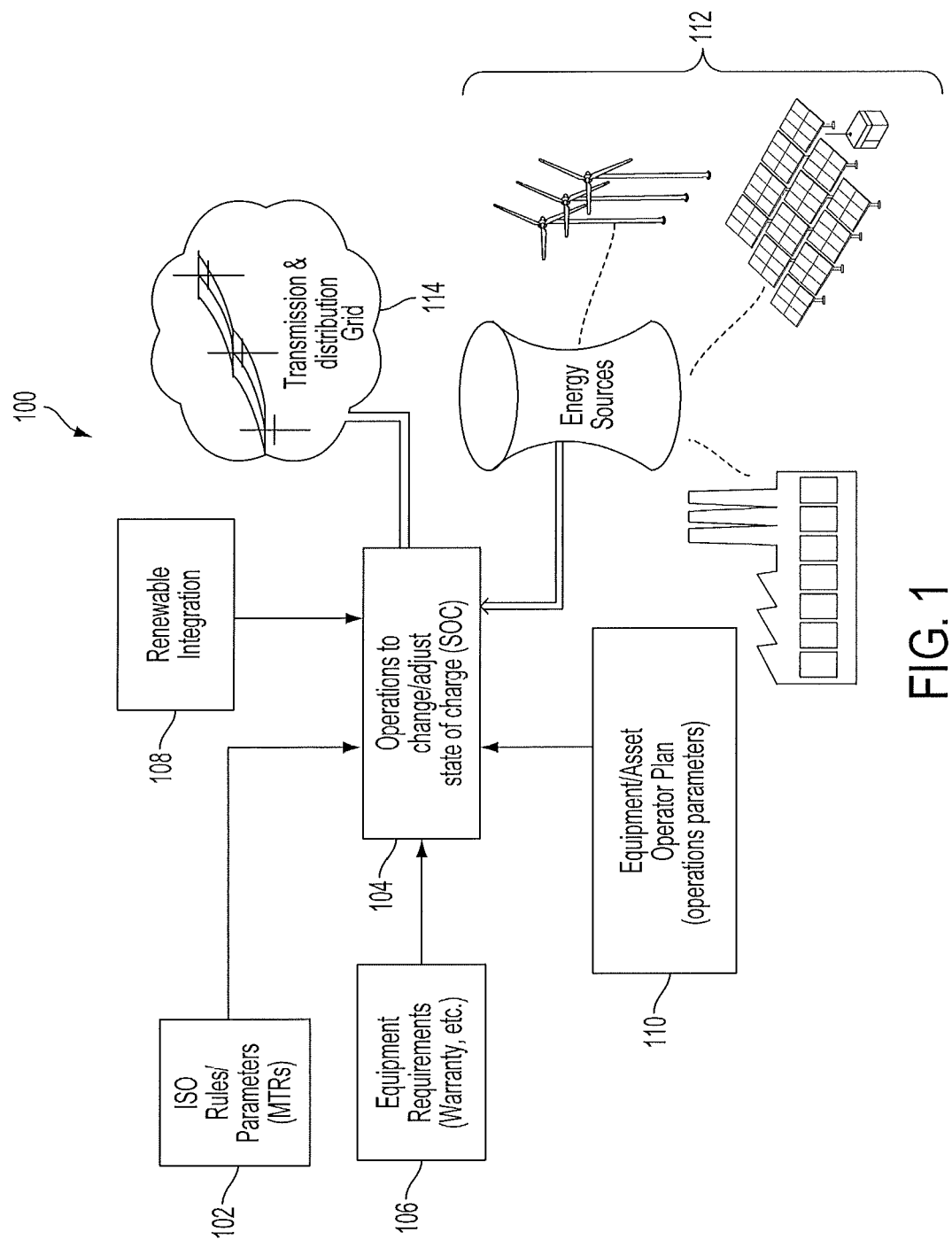
FIG. 1 is diagram illustrating an exemplary operating environment for energy sources connected to an electric grid, in accordance with exemplary embodiments.

FIG. 1 depicts an exemplary operating environment 100 for energy sources 112 connected to an electric grid 114. As shown in FIG. 1, operations 104 to adjust a state of charge (SOC) for an energy storage device within the environment 100 can be based upon a plurality of parameters, rules, and inputs, including, but not limited to MTRs 102 of an operator of the grid 114, equipment requirements 106, renewable integration factors 108, and/or equipment operator parameters 110. In the non-limiting example shown in FIG. 1, the MTRs 102 are rules set by an ISO that operates a transmission and distribution (T&D) grid 114. In alternative embodiments, an RTO, a power pool, or other operator of the grid 114, such as an individual electric power utility, can establish the MTRs 102 according to their needs. As seen in FIG. 1, the equipment requirements 106 can be based on warranty requirements for an energy storage device to ensure that a manufacturer's warranty for the energy storage device is not voided. In certain embodiments, the equipment requirements 106 can comprise safety requirements to ensure that the energy storage device does not overheat or otherwise become unsafe to operate.

According to embodiments, the operations 104 to adjust the (SOC) of an energy storage device are based in part on renewable integration factors 108 particular to renewable generation. Such renewable generation can be from renewable energy sources 112 such as those shown in FIG. 2 (i.e., the wind and solar energy sources 112). The renewable integration factors 108 can comprise the elements of the Setpoint Autopilot algorithm described below with reference to FIG. 8. For example, a Setpoint Autopilot algorithm can calculate an indicated set point having two components—a moving average of the renewable generation and an SOC bias factor. In one embodiment, the time period for calculating the moving average can be related to the energy capacity of the energy storage device. For example, devices with higher energy capacity could average over a longer time period than devices with lower energy capacity. In certain embodiments, the operations parameters 110 are based on an operator plan for an operator of the energy storage device equipment. In the specific example of FIG. 1, the operations parameters 110 are based on an asset operator plan for an operator of the energy storage device. One example of an asset operator is the AES corporation.

Dynamic Bias Algorithm

Certain signal characteristics can be identified that will tend to overheat an energy storage device or cause it to become full or empty. Such characteristics can factor into the equipment requirements 106 and/or the operations parameters 110 described above with reference to FIG. 1. These characteristics can be identified in real time, and a bias algorithm can be dynamically adjusted to provide a firmer or weaker response, depending on the characteristics of the signal. In an exemplary embodiment, a polynomial function invoked as part of a Dynamic Bias algorithm can be dynamically adjusted to produce a smaller or larger polynomial bias factor depending on the regulation signal characteristics. According to certain embodiments, the polynomial function can be a $7^{th}$ order polynomial function such as the function depicted in FIGS. 2, 5A and 6, which are described below.

For example, if a regulation signal is positive, it indicates to an energy storage device to discharge power according to the value of the signal. If a regulation signal remains positive for a long enough time, even if it is telling the energy storage device to discharge a relatively small amount of power, eventually the energy storage device will become empty. One way to predict that this might happen is to evaluate the rate of change of the regulation signal from one second to the next. Regulation signals that have a small rate of change are more likely to remain positive (or negative) for longer periods and are more likely to drain (i.e., fully discharge) or fill the energy storage device.

For example, signals that call for the energy storage device to charge or discharge large amounts of power tend to cause the energy storage devices to overheat.

Figure 2:
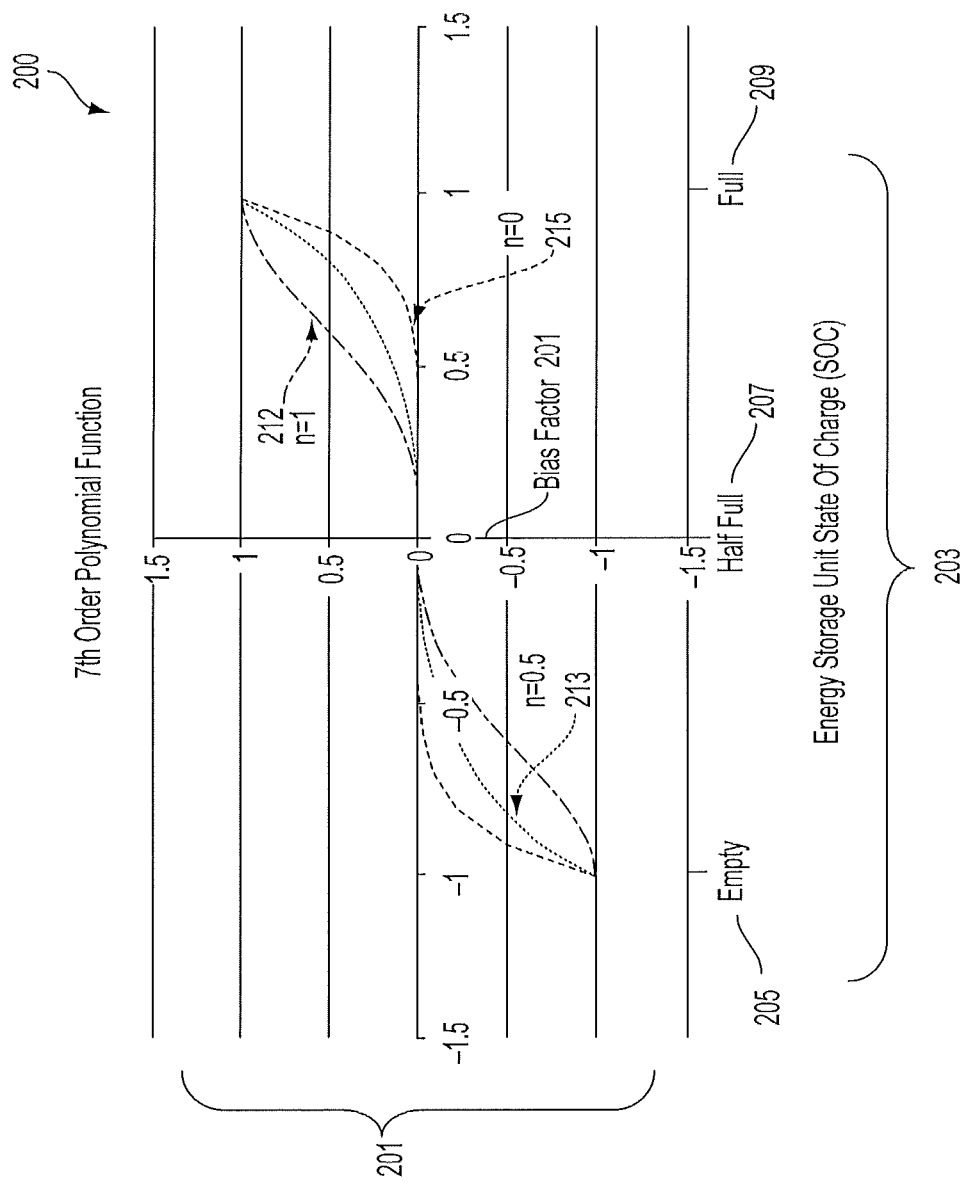
FIG. 2 is a graph of a $7^{th}$ order polynomial function that can be dynamically adjusted based on signal characteristics, in accordance with exemplary embodiments.

FIG. 2 depicts a graph 200 of bias factors 201 for a $7^{th}$ order polynomial function. In particular, graph 200 shows how an exemplary bias factor 201 changes for different states of charge 203 when the value of n, the composite score for the signal, changes. In one embodiment, the composite score n shown in FIG. 2 is a composite score 570 produced by the averaging and transformation process 550 described below with reference to FIG. 5B.

As shown in FIG. 2, when the value of n is 0 (i.e., the characteristics of the signal are more desirable) the polynomial function will return a bias factor 201 as shown in bias plot 215 when the transformed unit state of charge 203 is input to the equation. The expectation is that the signal, since it is more desirable, will change signs relatively more frequently and will naturally tend to keep the state of charge in the middle, around half full (e.g., SOC 207 shown in FIG. 2). In accordance with an embodiment, the bias factor 201 will increase if the state of charge 203 drops below about ¼ full or rises above ¾ full. In the example shown in FIG. 2, the bias factor 201 will increase if the SOC approaches the empty SOC 205 or the full SOC 209. As shown in the exemplary embodiment of FIG. 2, if the state of charge 203 is between ¼ and ¾ full then the bias factor 211 will be very small.

With continued reference to FIG. 2, when the value of n is 1 (i.e., the characteristics of the signal are less desirable) the polynomial function will return a bias value according to the bias plot 212 when the transformed unit state of charge 203 is input to the equation. The expectation is that the less desirable signal will tend to remain either positive or negative for longer periods of time and will tend to drive the state of charge 203 toward the full SOC 209 or empty SOC 205 more rapidly. According to embodiments, substantially higher bias factors 201 will be calculated for the less desirable signal as the state of charge 203 deviates from 50%.

When the value of n is between 0 and 1, for example, 0.5 as shown in FIG. 2, the polynomial function will return a bias value according to the bias plot 213 when the transformed unit state of charge 203 is input to the equation. In accordance with embodiments, these bias factors 201 will be higher than those for the more desirable signal and lower than those for the less desirable signal.

The $7^{th}$ order polynomial function graphed in FIG. 2 is just one example of many functions that can be used with the Dynamic Bias algorithm. Other examples include the $7^{th}$ order polynomial function 514 shown in FIGS. 5A and 6, which are discussed below.

Threshold Scoring

Figure 3:
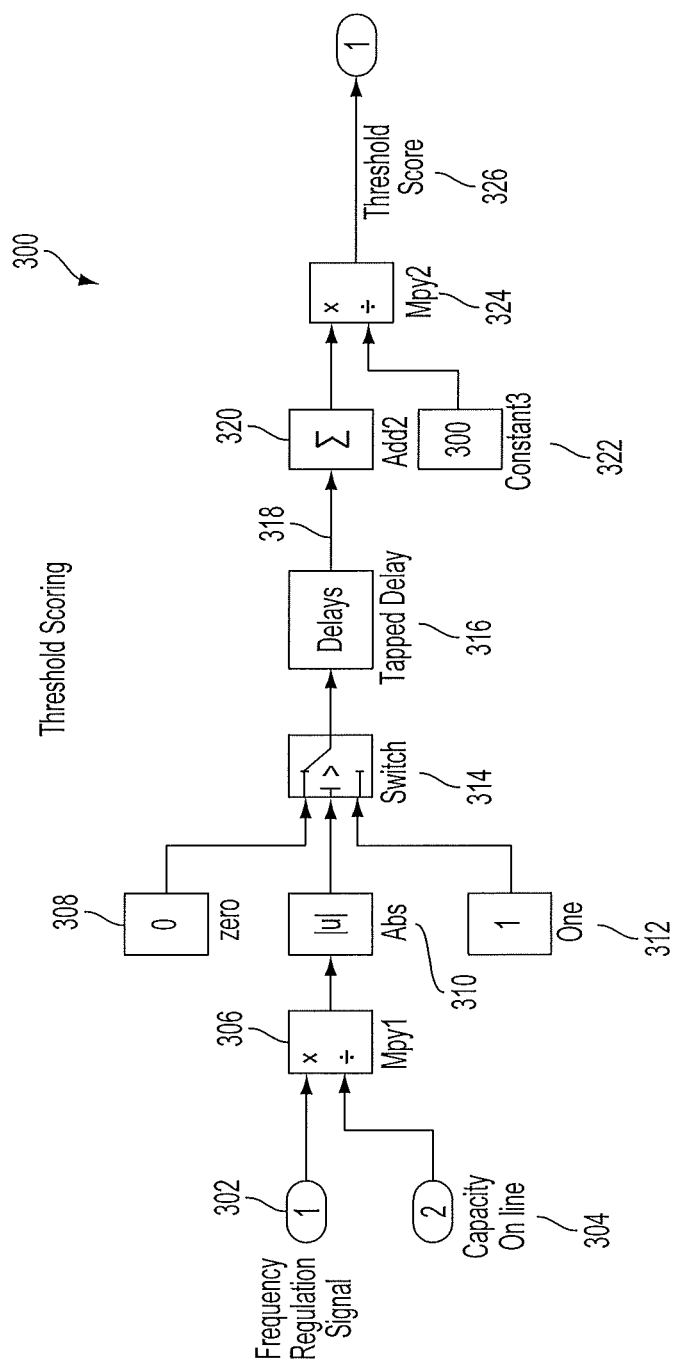
FIG. 3 is a block diagram that depicts a threshold scoring method, in accordance with exemplary embodiments.

By using an algorithm, a 'score' can be created for a regulation signal that ranges from 0 to 1 (for example) where 0 represents a signal that is very strongly positive or negative most of the time and 1 represents a signal that is not strongly positive or negative most of the time. FIG. 3 shows an example of how this algorithm, referred to as 'Threshold Scoring', might be implemented.

The exemplary threshold scoring process 300 depicted in FIG. 3 begins at step 306 when a frequency regulation signal 302 and a capacity on line 304 are received and multiplied (or divided, depending on the values of the frequency regulation signal 302 and a capacity on line 304). After step 306 is completed, control is passed to step 310, where the absolute value of the output of step 306 is determined.

At this point, control is passed to step 314, where control logic evaluates the absolute value together with constants 308 and 312 (a zero and a one, respectively, in the example of FIG. 3). After the evaluation, control is passed to step 316.

In step 316, tapped delays are taken into account and an interim value 318 is output. In step 320, a number is added to the interim value 318 before passing control to step 324 where the output of step 320 is then multiplied (or divided by) a constant 322 (300 in the example shown in FIG. 3) in step 324 to produce the threshold score 326.

In this case, a frequency regulation signal 302 with a threshold score 326 of 0 is less desirable because more heat will be produced as more power flows in and out of the energy storage device, and a frequency regulation signal 302 with a threshold score 326 of 1 is more desirable because less heat will be produced as less power flows in and out of the storage device.

First Differences Scoring

Figure 4:
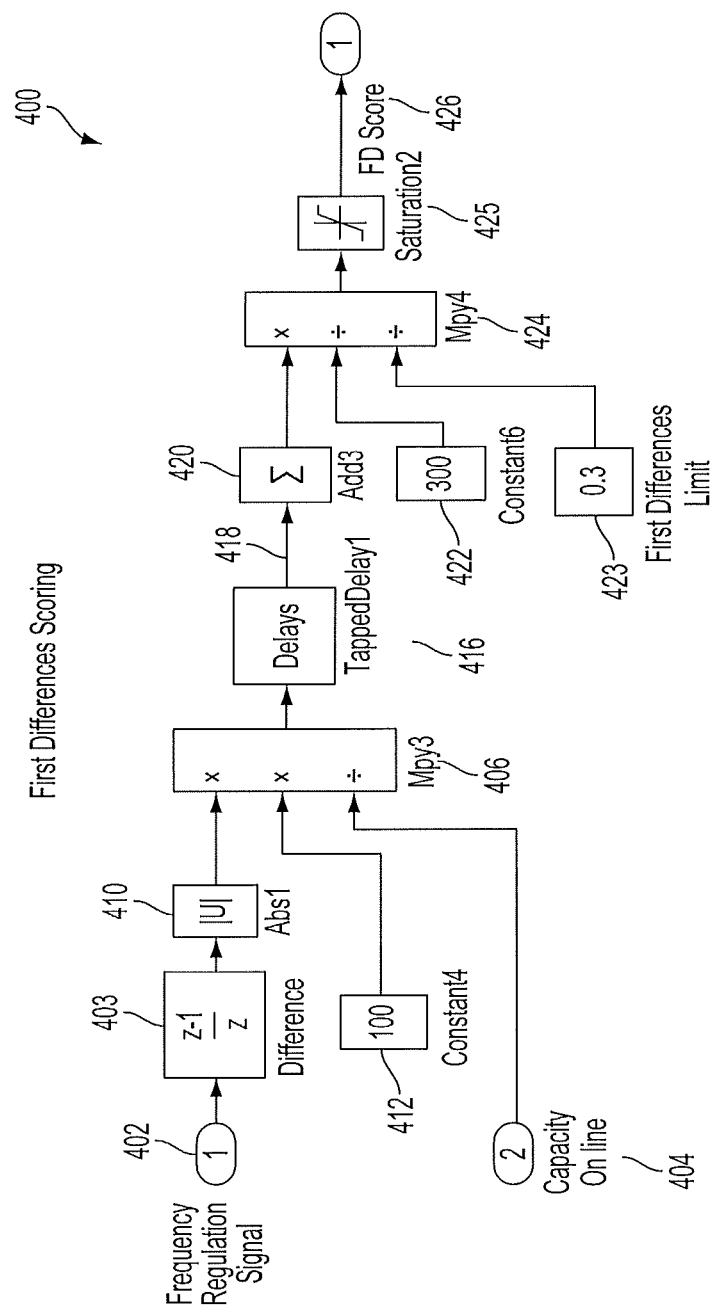
FIG. 4 is a block diagram that depicts a first differences scoring method, in accordance with exemplary embodiments.

In another embodiment, a 'score' can be created for a regulation signal that ranges from 0 to 1 (for example) where 0 represents a signal that seldom changes and 1 represents a signal that changes by a larger amount more often. FIG. 4 depicts an example of how such an algorithm, referred to as 'First Differences Scoring', might be implemented in a first differences scoring process 400.

As shown in FIG. 4, the first differences scoring process 400 begins in step 403 when a frequency regulation signal 402 is received. After the frequency regulation signal 402 is received, control is passed to step 403.

In step 403, a difference function is performed on the frequency regulation signal 402 before passing control to step 410, where the absolute value of the output of step 403 is determined. In step 406, that absolute value is multiplied together with a constant 412 (i.e., 100 in the example of FIG. 4) and the product of that multiplication is divided by a capacity on line 404. At this point, control is passed to step 416, where tapped delays, if any, are taken into account and an interim value 418 is output to step 420.

In step 420, a number is added to the interim value 418 before passing control to step 424. In step 424, the output of step 420 is then multiplied (or divided by) a constant 422 (300 in the example shown in FIG. 4) to produce the threshold score 426.

In this case, a frequency regulation signal 402 that receives a threshold score 426 of 0 would be a less desirable signal than a frequency regulation signal 402 that received a threshold score 426 of 1. The frequency regulation signal 402 that received a threshold score 426 of 0 will be less desirable because it is less likely to change and less likely to reverse itself often (i.e., go from positive to negative or vice-versa) and therefore more likely to remain positive or negative for a longer time and be more likely to fill or drain the storage device. The frequency regulation signal 402 that received a threshold score 426 of 1 is more desirable because it is more likely to change by a larger amount and more likely to reverse and therefore less likely to fill or drain an energy storage device such as a battery.

Implementation of a Polynomial Function

Figure 5A:
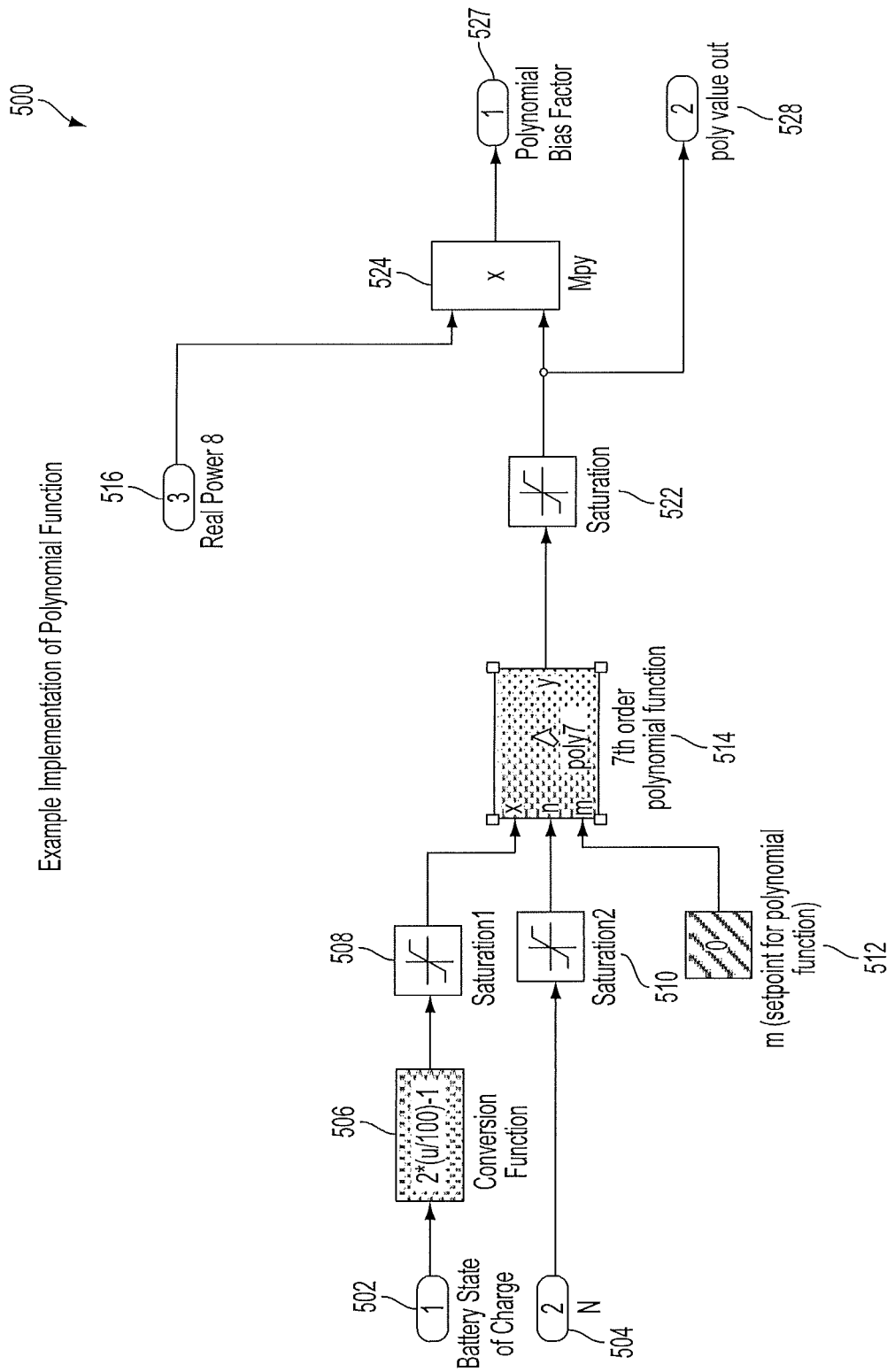
FIG. 5A is a block diagram that depicts an exemplary implementation of a $7^{th}$ order polynomial function.

An exemplary implementation 500 of a $7^{th}$ order polynomial function is shown in FIG. 5A. As shown in FIG. 5A, implementation 500 receives a battery state of charge (SOC) 502 and a composite score 504. In one embodiment, the composite score 504 can be produced by the averaging and transformation process 550 described below with reference to FIG. 5B. The composite score 504 can also be the value n shown in the graphical display of the $7^{th}$ order polynomial function 514 provided in FIG. 6. After the composite score 504 is received, control is passed to step 506.

In step 506, the battery SOC 502 is passed into a conversion function that outputs the converted battery SOC 502 to step 508. In step 508, a saturation function is performed on the converted battery SOC 502. In parallel with step 508, step 510 performs a saturation function on the composite score 504, before invoking the $7^{th}$ order polynomial function 514.

At this point, the outputs of saturation functions 508 and 510 are input into the $7^{th}$ order polynomial function 514. These outputs are shown as the x and n variables in FIGS. 5A and 6. As shown in FIG. 5A, these two values are passed to the $7^{th}$ order polynomial function 514 along with a setpoint 512. The setpoint 512 is a setpoint for the $7^{th}$ order polynomial function 514 and is depicted as the variable m in FIGS. 5A and 6. The output of the $7^{th}$ order polynomial function 514 is then passed to a saturation function 522 to produce a polynomial value output 528.

At this point, control is passed to step 524 where the polynomial value output 528 is multiplied by a real power 516 to produce a polynomial bias factor 527.

Composite Scoring

Figure 5B:
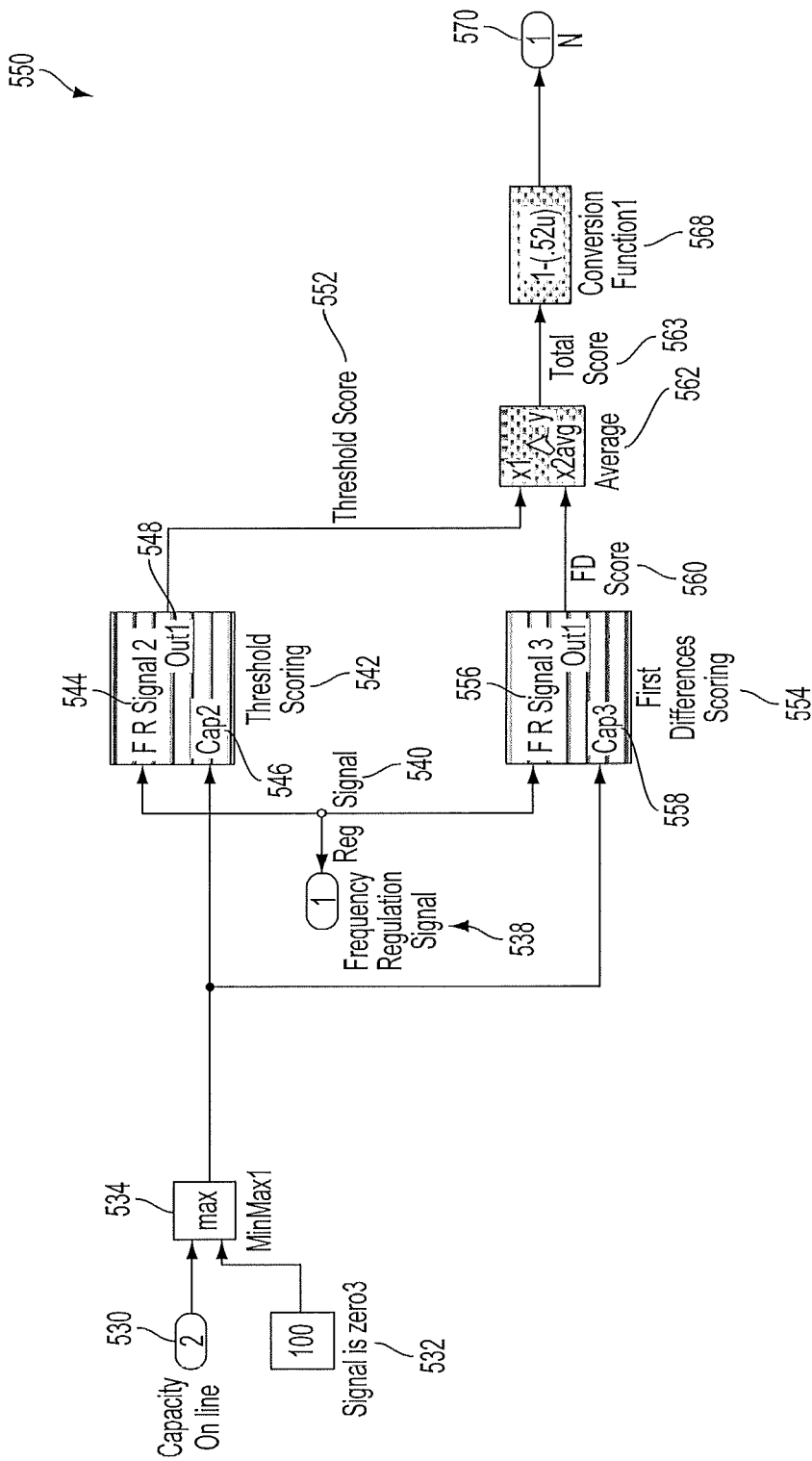
FIG. 5B is a block diagram that shows a method for combining first differences scores and threshold scores into a composite score, in accordance with exemplary embodiments.

Certain embodiments can then average or weight-average and transform the two scores for the frequency regulation signal to calculate a composite score that also ranges from 0 to 1. FIG. 5B shows an example of such an averaging and transformation process.

As shown in FIG. 5B, an averaging and transformation process 550 can create a composite score 570 based on a threshold score 552 produced by threshold scoring in step 542 and a first differences score 560 output from a first differences scoring step 554.

The averaging and transformation process 550 begins in step 534 when a capacity on line 530 and a signal 532 are received. In the exemplary embodiment of FIG. 5B, the signal 532 is a zero signal. In step 534 a minimum/maximum (minmax) function is performed on the capacity on line 530 and the regulation signal 532 before passing the output of the minmax function to steps 542 and 554 for threshold and first differences scoring, respectively.

In step 542, threshold scoring is performed based on a frequency regulation signal 544 and capacity 546 in order to produce a threshold score 552. In one embodiment, step 542 can be carried out as described above with reference to the threshold scoring process 300 illustrated in FIG. 3. In the embodiment shown in FIG. 5B, a regulation signal 540 can be read by both steps 544 and 554, and can also be output as a frequency regulation signal 538.

In step 554, threshold scoring is performed based on a frequency regulation signal 556 and capacity 558 in order to produce a first differences score 560. According to an embodiment, step 554 can be implemented as described above with reference to the first differences scoring procedure 400 shown in FIG. 4.

In alternative embodiments, the threshold and first differences scoring steps 542 and 554 can be implemented as one or more modules or system components configured to calculate a threshold score 552 and first differences score 560, respectively.

After the threshold and first differences scores 552 and 560 are calculated, control is passed to step 562 where these scores are averaged to determine a total score 563. At this point, control is passed to step 568 where the total score 563 is input into a conversion function. The execution of the conversion function in step 568 produces a composite score 570.

With continued reference to the exemplary embodiment of FIG. 5B, a value of 0 for the composite score 570 can represent a signal 532 that was less positive or negative most of the time and changed often (more desirable), and a value of 1 for the composite score 570 would represent a signal 532 that was very strongly positive or negative most of the time and seldom changed (less desirable). This composite score 570 can be used in conjunction with a mathematical function, such as a polynomial function, to alter the way an SOC bias factor is calculated. An example of such a polynomial function is the $7^{th}$ order polynomial function 514 shown in FIGS. 5A and 6. As shown in the exemplary graphical user interface of FIG. 6, the $7^{th}$ order polynomial function 514 can be expressed as:

$$y = 3.35 * n * (x^3) - 3.35 * n * (x^5) + (x^7)$$

where n is the composite score mentioned above and x is a transformation of the unit state of charge according to the following formula:

$$x = 2 * SOC - 1$$

where SOC is the current state of charge of an energy storage unit, from −1 (empty or substantially empty) to 1 (full or substantially full).

Figure 6:
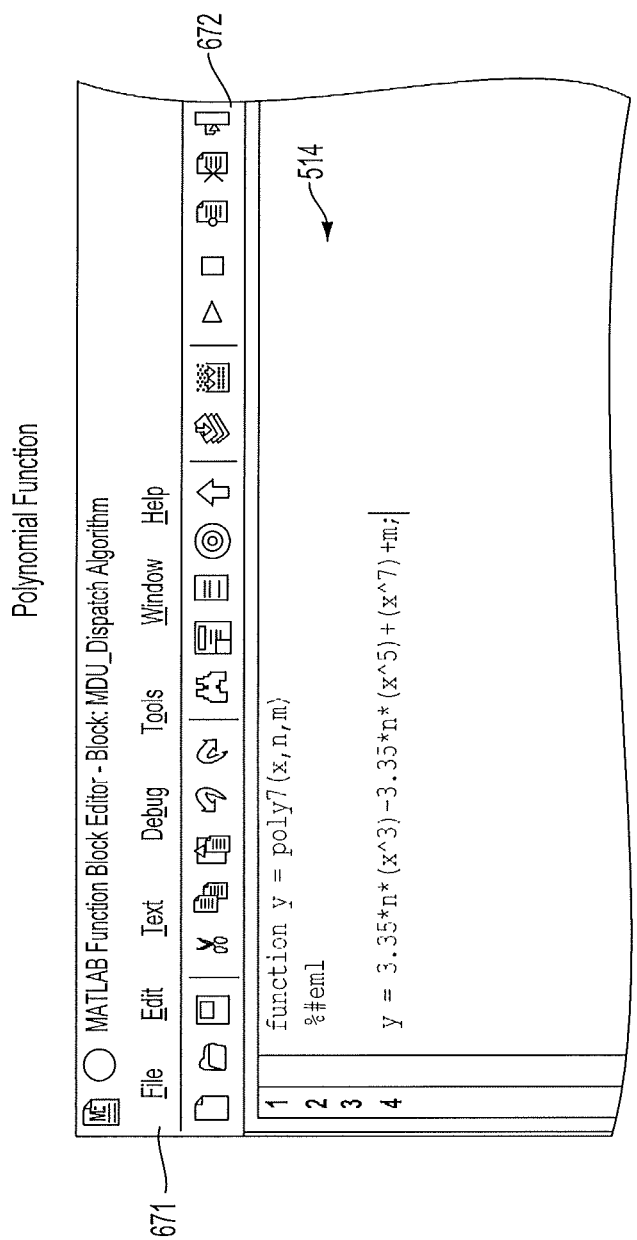
FIG. 6 illustrates an exemplary graphical user interface for displaying and editing a $7^{th}$ order polynomial function.

It is to be understood that the scoring mechanism illustrated above is just one of many possible scoring mechanisms that can be used with embodiments disclosed herein. With reference to FIG. 6, scoring mechanisms such as the exemplary $7^{th}$ order polynomial function 514 can be created, edited, saved, and retrieved by selecting, via an input device (not shown), one of more of the contextual menus 671 and/or icons shown in tool bar 672. For example, in embodiments, scoring mechanisms can be created, edited, and selected that measure the characteristics of an incoming regulation signal that can be detrimental to an energy storage device, formulate a composite score in real time, and input them to a function that will alter its response so as to facilitate longevity and/or continuity of operation of the energy storage device.

State of Charge Range Maintaining Algorithm

One of the issues facing markets that are incorporating limited energy storage resources for providing regulation services is how to evaluate the performance of these resources. For example, part of the performance evaluation criteria may involve checking the state of charge of the resource every five minutes to ensure that there is sufficient charge to maintain service for another five minutes if the unit receives a signal to either charge or discharge at full power. If the unit does not have sufficient power to provide both full charge and full discharge for the next five minutes then the system operator determines the maximum power that can be charged and discharged for this period, and the lower value becomes the effective capacity for the unit for this next five minute period, and the unit owner is compensated for this lower capacity value rather than the full capacity of the unit.

For example, suppose the unit owner has a 10 megawatt (MW), 15-minute resource. This means that the unit can provide full output, 10000 kilowatt (kW), for 15 minutes, and the energy capacity of the unit would be 10000 KW*0.25 hours or 2500 kilowatt hours (kWH). If the transmission system operator were to evaluate the state of charge of the unit at a particular point in time and see that the unit is currently charged at 80%, this would mean that the batteries contain 80% of their maximum capacity of energy, or 2000 kWh. In order to discharge at full capacity for another five minutes the battery would have to be able to send out 10000*5/60 kWh, or 833 kWh. Similarly, in order to charge at full capacity for the next five minutes the unit would have to be able to absorb 833 kWh. Since the batteries are charged to 80% capacity and contain 2000 kWh they are fully capable of discharging at full power for another five minutes. They only have 500 kWh of extra capacity available for charging, however (2500-2000), so they are not capable of charging at full power for another five minutes because they would have to absorb 833 kWh. They are capable of charging at 500*60/5 or 6000 kW for another five minutes, so the unit will receive a capacity credit of 6000 kW instead of 10000 kW for the next five minutes.

The problem is how to adjust the operation of the storage device to maximize the revenues in the market by making sure that the unit has at least five minutes of full-power capacity to charge and discharge as often as possible. Current methodologies and algorithms do not address state of charge from this perspective specifically.

Figure 7:
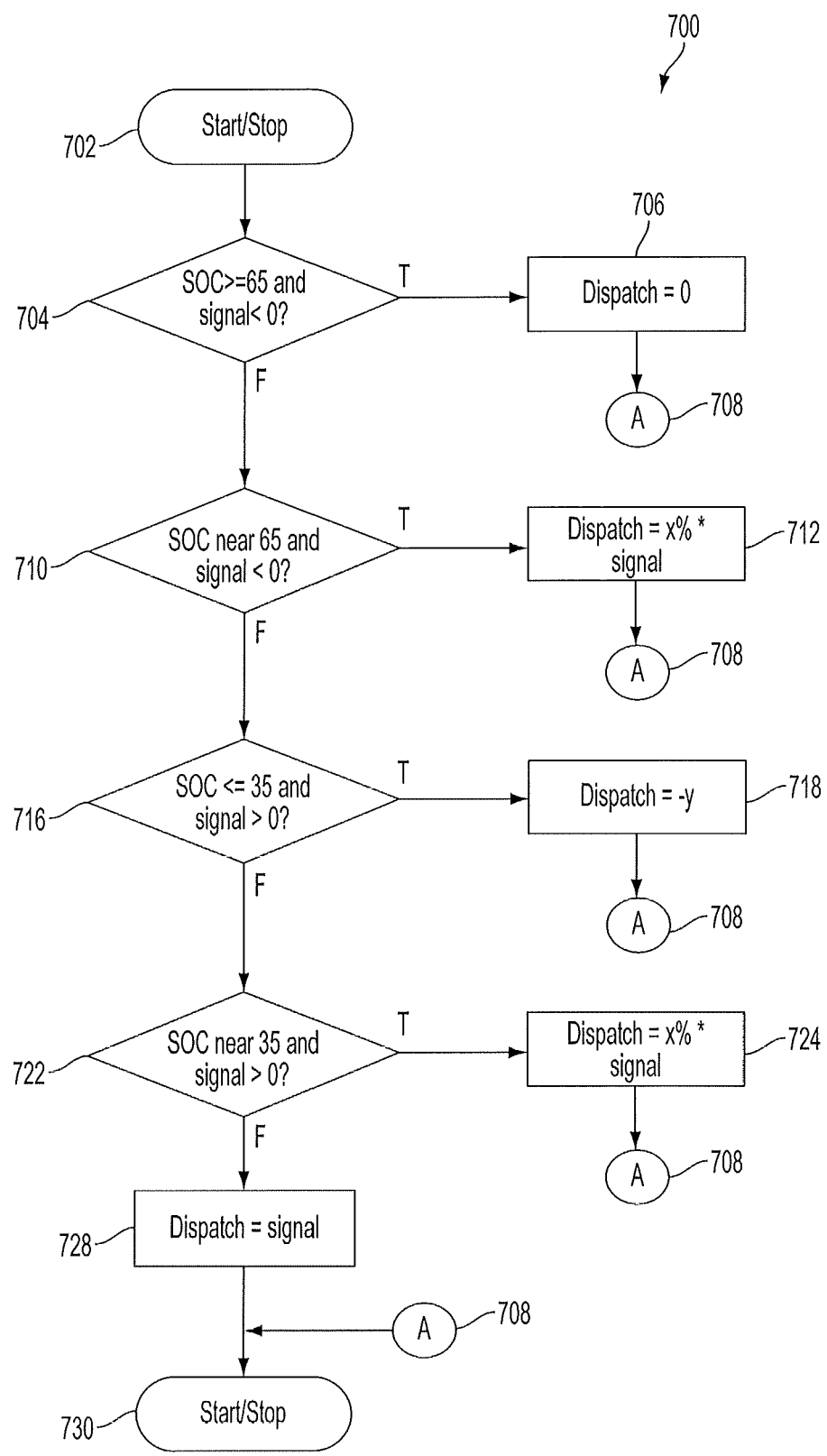
FIG. 7 is a flowchart illustrating steps by which a State of Charge (SOC) range can be maintained, in accordance with exemplary embodiments.

FIG. 7 provides a flowchart depicting the steps by which an exemplary SOC range maintaining method 700 might work for a 15-minute resource. Upper and lower desired limits on the state of charge (SOC) can be set based on the battery capacity and the desired amount of continued full-power operation. In the example shown in FIG. 7, we want to see a continued 5 minutes of full power operation using a 15 minute resource, so the desired upper limit would be ⅔ or slightly less (65% in the example shown in steps 704 and 710) and the desired lower limit would be ⅓ or slightly more (35% in this example shown in steps 716 and 722).

Method 700 begins in step 702 and proceeds to step 704 where it is determined if the state of charge (SOC) is greater than or equal to 65% and the regulation signal is less than zero. If it is determined in step 704 that the SOC is greater than or equal to 65% and the regulation signal is less than zero, then the system is exceeding the desired range of SOC and still charging, so control is passed to step 706 to set the dispatch signal accordingly. Otherwise, if it determined that the SOC is less than 65% or the regulation signal greater than or equal to zero, then control is passed to step 710.

In step 706, the dispatch signal to the batteries is set to zero. After the dispatch signal to the batteries is set to zero, control is passed to step 708.

In step 708, the dispatch signal has been set and control passes to step 730 where the method 700 completes.

In step 710, a determination is made as to whether the SOC is less than but close to 65% and the regulation signal is less than zero or not. In this step, if it is determined that the SOC is less than but close to 65% and the regulation signal is less than zero, then control is passed to step 712. Otherwise, control is passed to step 716.

In step 712, the dispatch signal to the batteries is set to a fraction of the regulation signal to 'slow down' the approach to the desired upper limit on SOC. After the dispatch signal to the batteries is set to a fraction of the regulation signal, control is passed to step 708.

In step 716, if it is determined that the SOC is less than or equal to 35% and the regulation signal is greater than zero, then the system is below the lower limit of the desired range of SOC and still discharging and control is passed to step 718 so that the dispatch signal is set to a number that will cover the auxiliary load and provide a 'trickle charge' to the batteries. Otherwise, control is passed to step 722.

In step 718, after the dispatch signal is set to a number that will cover the auxiliary load and provide a trickle charge to the batteries, control is passed to step 708.

In step 722, if it is determined that the SOC is greater than but close to 35% and the regulation signal is positive, then control is passed to step 724 so that the dispatch signal can be set to a fraction of the regulation signal to 'slow down' the approach to the desired lower limit on SOC. Otherwise, control is passed to step 728.

In step 724, after the dispatch signal is set to a fraction of the regulation signal in step 724, control is passed to step 708.

In step 728, the dispatch signal is set to the regulation signal and control is passed to step 730 where the method 700 completes.

The method 700 described above with reference to FIG. 7 provides operational control over the state of charge of an energy storage device. An embodiment of the method 700 can be used to maximize the revenues in a market where these revenues depend, in part, on the state of charge of the device. When such an SOC Range Maintaining algorithm is absent, the state of charge can deviate from the desired range, which can adversely affect revenues.

Set Point Autopilot Algorithm

According to an embodiment, the Set Point Autopilot Algorithm adjusts the rate of change management introduced during the performance of ancillary services based on the desired rate of change of output of a variable generation source.

According to an embodiment, with set point regulation, the energy storage device is used to maintain total output at a fixed amount, measured in kilowatts or megawatts. In this form of regulation the energy storage device charges or discharges by the difference in power between the intermittent renewable output and the set point.

In normal operation a set point regulation algorithm either requires an energy storage device with a high energy capacity or careful manual intervention to make sure that the storage device does not become too full or empty if there is a significant excursion in renewable system output.

In an embodiment, a set point autopilot algorithm:

a.) Automatically decides when the set point needs to be changed, b.) Automatically calculates a new set point, c.) Moves the output of the system from the old set point to the new set point at a user-defined ramp rate, and d.) Incorporates, as part of its algorithm, the capability to restore the energy storage device to a desirable state of charge.

This algorithm can be used with energy storage devices that have limited amounts of energy available for regulation, can stabilize the system output at certain levels of output when the renewable generation is itself stable, and can help maintain the state of charge of the energy storage device. This algorithm can enable a substantially smaller energy storage device to regulate the output of any intermittent renewable generation source than would otherwise be required by a normal ramp regulation algorithm.

Figure 8:
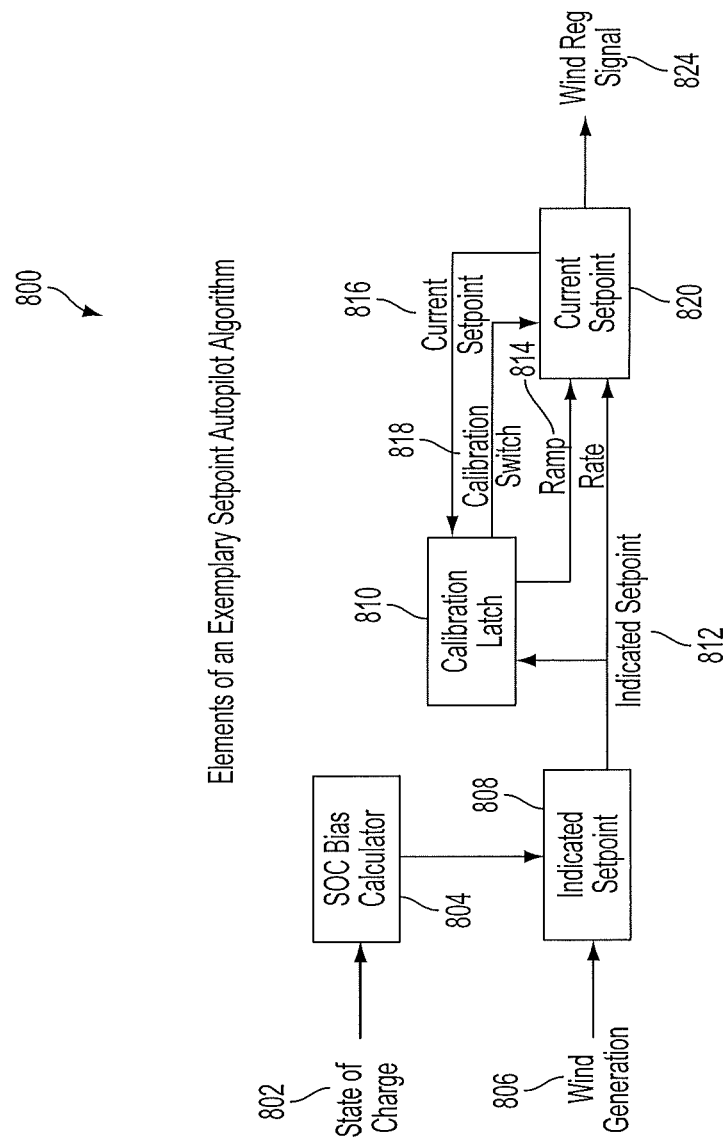
FIG. 8 is a block diagram that depicts elements of a Setpoint Autopilot algorithm, in accordance with exemplary embodiments.

Exemplary elements of a Setpoint Autopilot algorithm are shown in FIG. 8. As shown in the example embodiment of FIG. 8, a Setpoint Autopilot algorithm can be implemented by a method that 800 begins when a state of charge (SOC) 802 is received.

Figure 9:
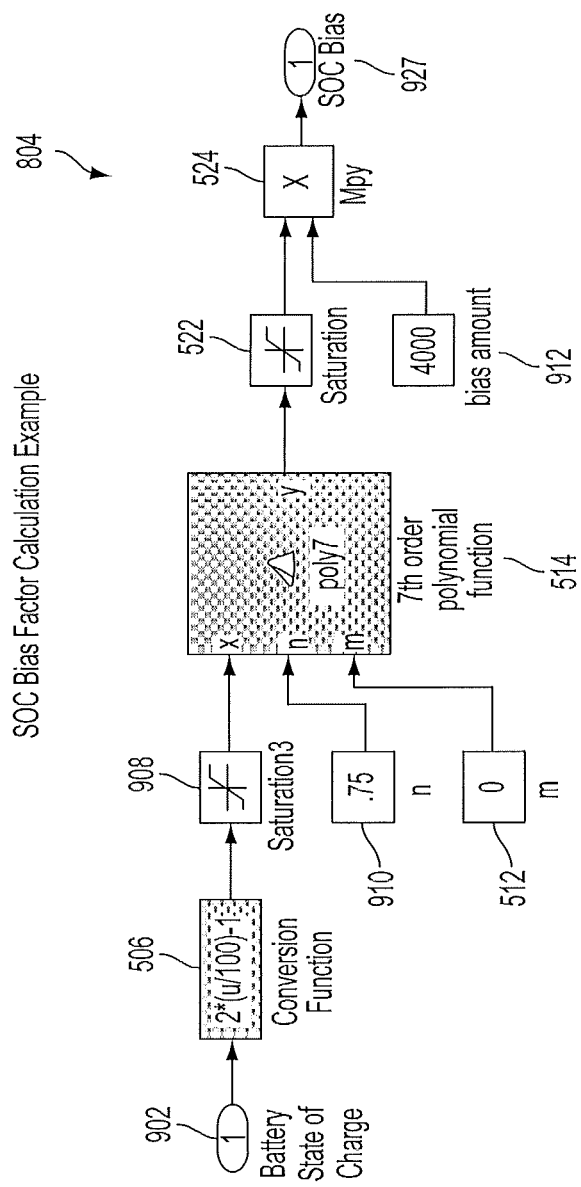
FIG. 9 is a block diagram that depicts an SOC bias calculator, in accordance with exemplary embodiments.

In step 804, the SOC 802 is input to an SOC bias calculator, which then passes the calculated SOC bias to step 808. According to one embodiment, the first part of the algorithm 800 requires that a bias factor be calculated in step 804. An example method 900 for SOC bias factor calculation that can be used to accomplish step 804 is shown in FIG. 9, which is described below. According to an embodiment, this bias factor should be a function of the SOC 802 of the energy storage unit and step 804 can use any of a variety of methods to accomplish this. In certain embodiments, if the SOC 802 is too low, step 804 should calculate a negative SOC bias number and if the SOC 802 is too high, this step should calculate a positive SOC bias number.

In step 808, an indicated setpoint 812 is determined based on the SOC bias and a renewable generation 806 (i.e., wind generation in the example shown in FIG. 8). In an embodiment, the second part of the algorithm calculates an indicated set point 812. An example method 1000 for calculating indicated setpoint 812 is provided in FIG. 10, which is described below. The indicated set point 812 can have two components—the moving average of the renewable generation 806 and the SOC bias factor calculated in step 804. According to embodiments, the time period for calculating the moving average should be related to the energy capacity of the energy storage device—devices with higher energy capacity could average over a longer time period than devices with lower energy capacity. Using longer time periods for calculating the moving average will produce a set point that changes less often and is more stable, but may require more energy to regulate. When the difference between the combined moving average/bias factor and the indicated set point 812 exceeds a certain amount, then the indicated set point 812 is updated to the new value of the combined moving average/SOC bias factor. In accordance with and embodiment, small deviations in renewable generation 806 will be ignored, but large deviations will cause the indicated set point 812 to change. If the threshold value for updating the indicated set point 812 is set high, then the indicated set point 812 will change less often, but may require more energy to regulate.

Figure 12:
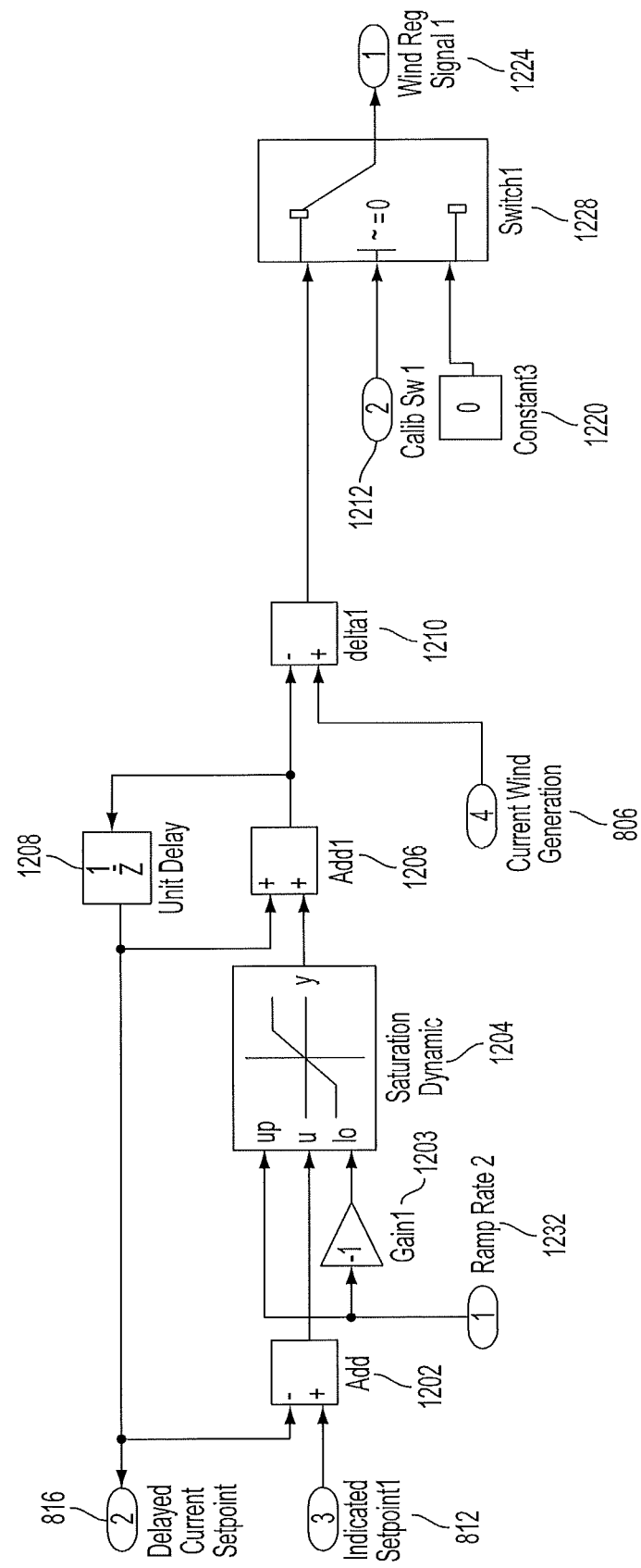
FIG. 12 is a block diagram that depicts a Current Setpoint calculation, in accordance with exemplary embodiments.

At this point, the indicated setpoint 812 is passed to step 820, where the indicated setpoint 812 is compared to a current setpoint 816. In accordance with an embodiment, step 820 compares the current set point 816 to the indicated set point 812. An example method 1200 for performing this comparison is shown in FIG. 12, which is described below. If it is determined in step 820 that the current setpoint 816 is different from the indicated setpoint 812, then the method 800 will move the current set point 816 toward the indicated set point 812 at a user-specified rate of change (i.e., ramp rate 814 shown in FIG. 8). This ensures that set point changes take place gradually and are not disruptive to the grid. The regulation signal 824 that is output by the method 800 to the energy storage device is the difference between the current set point 816 and the current level of renewable generation 806.

Figure 11:
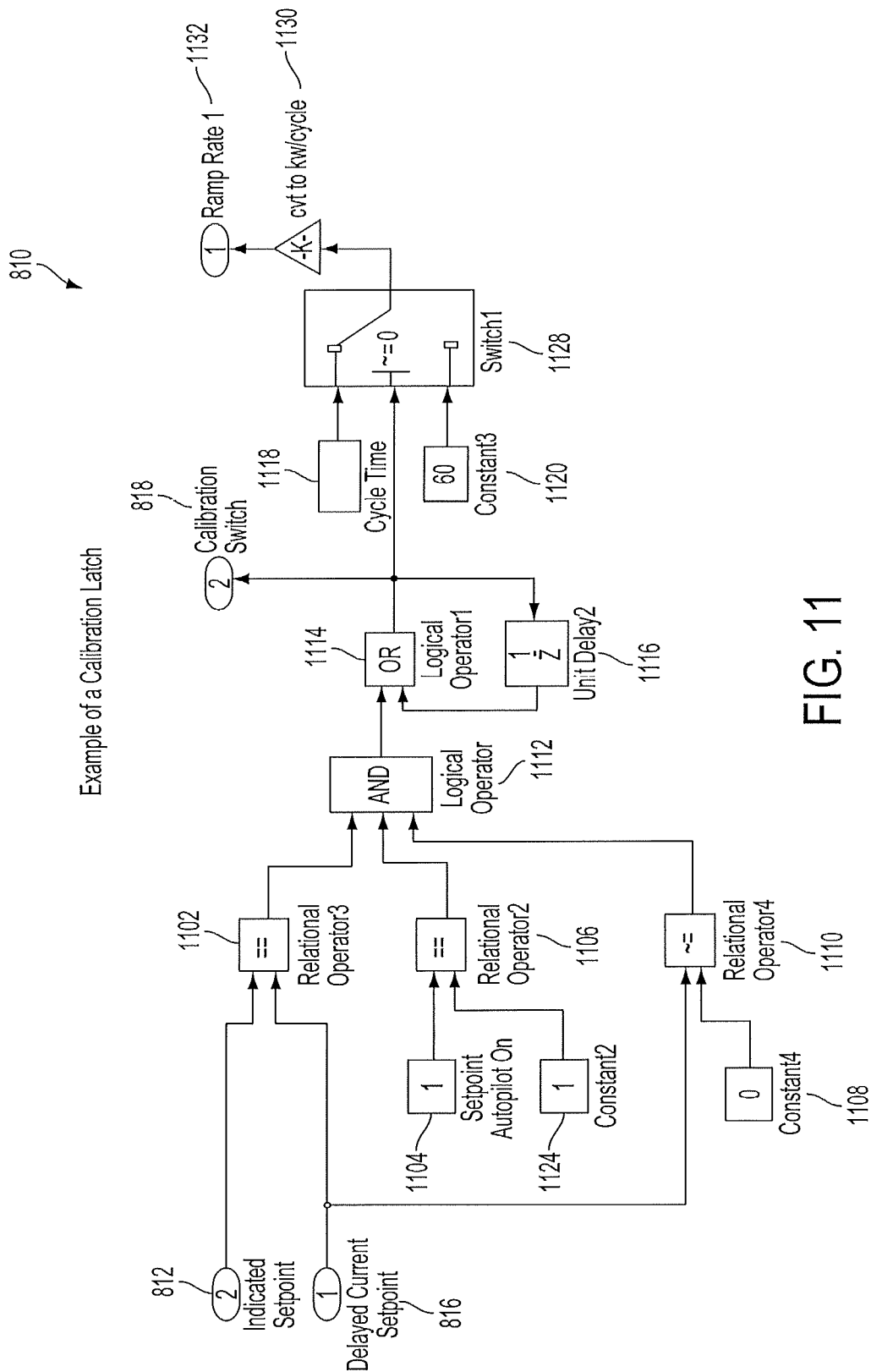
FIG. 11 is a block diagram that depicts a Calibration Latch, in accordance with exemplary embodiments.

In an alternative embodiment also shown in FIG. 8, the indicated setpoint 812 is passed to a calibration latch in step 810. In an embodiment, step 810 provides special handling when a Market Data Unit (MDU) program starts up. According to an embodiment, a calibration latch, an example of which is shown in FIG. 11, can temporarily disable the Setpoint Autopilot algorithm until the moving average has 'caught up' with the incoming signal. Examples of an MDU are described in U.S. application Ser. No. 13/527,354, entitled "Methods and Apparatus for Controlling Energy Services Based on Market Data," filed Jun. 19, 2012, which is incorporated herein by reference in its entirety. As shown in FIG. 8, outputs of step 810 from the calibration latch to step 820 can include a ramp rate 814 and a calibration switch 818. According to embodiments, the indicated and current set points 812 and 816 must be calculated before regulation can begin, and the method for doing this will depend upon which programming language or software package is being used to implement the Setpoint Autopilot algorithm.

SOC Bias Factor Calculation

With reference to FIG. 9, an exemplary SOC bias factor calculation 900 begins when a battery SOC 902 is passed to a conversion function. In the exemplary embodiment of FIG. 9, the conversion function is the same as that used in step 506 of FIG. 5A. In step 506, the battery SOC 902 is passed into a conversion function that outputs the converted battery SOC 902 to step 908. In step 908, a saturation function is performed on the converted battery SOC 902, before invoking the $7^{th}$ order polynomial function 514.

At this point, the output of the saturation function 908, a setpoint 512, and a composite score 910 are input into the $7^{th}$ order polynomial function 514. In FIG. 9. The setpoint 512 and the composite score 910 are shown as the m and n variables, respectively. The output of the $7^{th}$ order polynomial function 514 is then passed to a saturation function 522.

At this point, control is passed to step 524 where the output of the saturation function 522 is multiplied by a bias amount 922 to produce an SOC bias factor 927.

Indicated Setpoint Calculation

Figure 10:
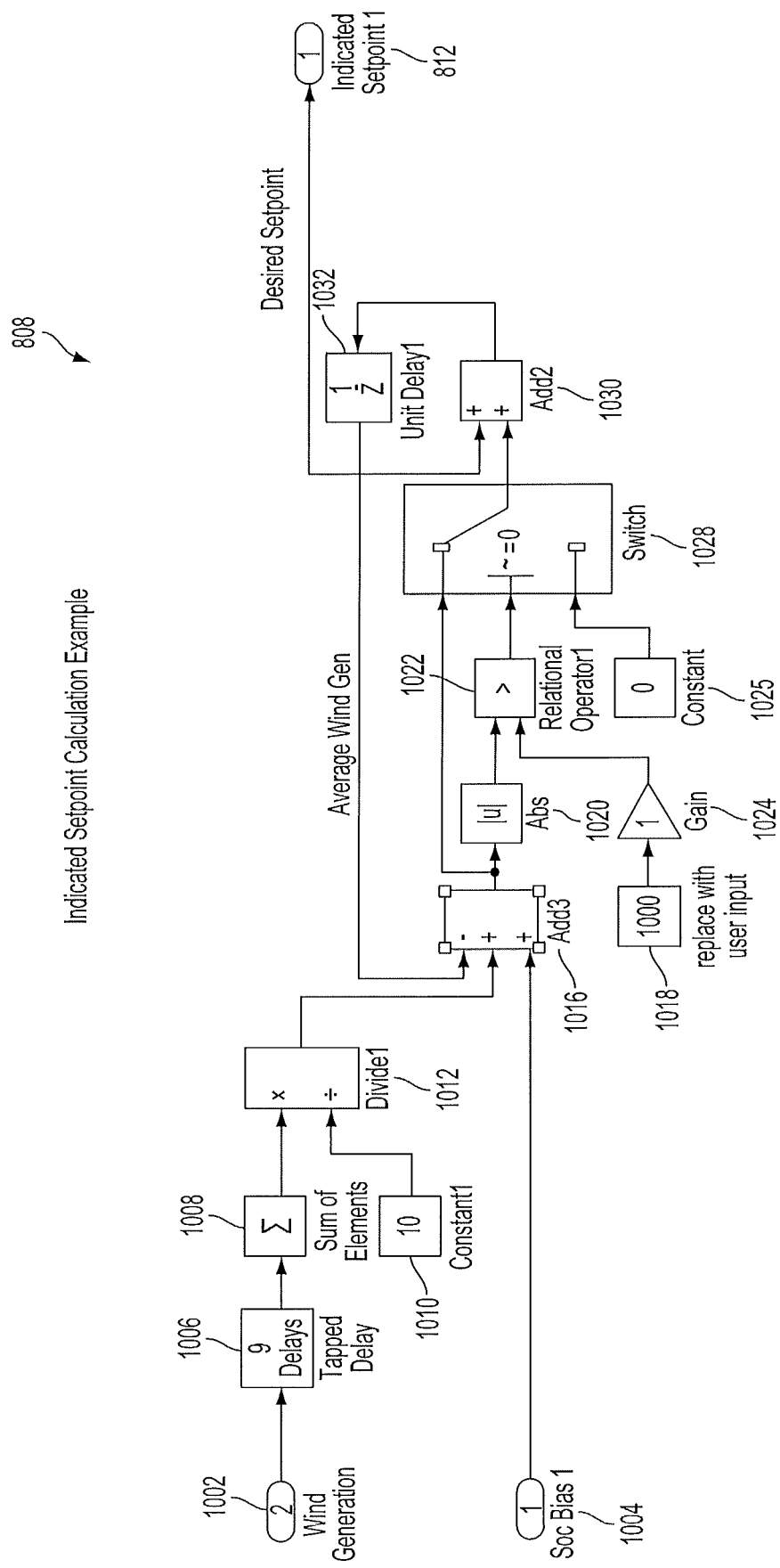
FIG. 10 is a block diagram that depicts an Indicated Setpoint calculation, in accordance with exemplary embodiments.

With reference to FIG. 10, an exemplary Indicated Setpoint calculation 1000 begins in step 1006 when a renewable generation 1002 (wind generation in the example of FIG. 10) is received.

At this point, control is passed to step 1006, where tapped delays are taken into account before continuing to step 1008. In step 1008, a sum of elements is calculated before passing control to step 1012 where the sum is then divided by a constant 1010 (10 in the example shown in FIG. 10).

Next, the output of step 1012 and an SOC bias 1004 are added together in step 1016. In step 1016, an average of renewable generation (e.g., wind generation in the exemplary embodiment of FIG. 10) is subtracted from the sum of the output of step 1012 and the SOC bias 1004 before control is passed to step 1020 where the absolute value of the output of step 1016 is determined. This absolute value is passed to step 1022.

In step 1022, it is determined if the absolute value is greater than a user-inputted value received in step 1018 that has been passed through a gain function in step 1024. The greater of the absolute value and the output of step 1024 is then passed to step 1028.

In step 1028, control logic is executed on the output of step 1022 and a constant 1025 (e.g., 0 in the example of FIG. 10). The output of step 1028 is then passed to step 1030 where it is added to a desired setpoint in order to complete the calculation of the indicated setpoint 812.

As shown in FIG. 10, the sum from the addition performed in step 1030 can also be passed to step 1032, where any unit delay is determined. The output of step 1032 can include the average renewable generation (e.g., average wind generation in the example of FIG. 10) that can be input into step 1016 as described above.

Exemplary Calibration Latch

With reference to FIG. 11, an exemplary Calibration Latch 1100 performs a relational operation 1102 on an indicated setpoint 812 and a delayed current setpoint 816 to determine if they are equal to each other. The Calibration Latch 1100 also performs a relational operation 1106 on a setpoint autopilot value 1104 and a delayed constant 1124 (i.e., 1 in the example of FIG. 11) to determine if they are equal to each other. Another relational operation 1110 is performed on a constant 1108 (i.e., 0 in the example of FIG. 11), and the delayed current setpoint 816 to determine if they are equal to each other.

Next, in step 1112, a logical AND operation is performed on the result of the relational operations 1102, 1106 and 1110. The output of step 1112 is passed to step 1114 where a logical OR operation is performed on that output and a unit delay calculated in step 1116 based upon a received calibration switch 818.

At this point, control is passed to step 1128, where control logic is executed on the output of step 1112, a constant 1120 (i.e., 60 seconds in the example of FIG. 11) and a cycle time 1118. The results of step 1128 are then passed to step 1130 where they are converted to kilowatts/cycle in order to produce the ramp rate 1132.

Current Setpoint Calculation

With reference to FIG. 12, an exemplary Current Setpoint calculation 1200 begins in step 1202 when an indicated setpoint 812 and a delayed current setpoint 816 are added. Next, in step 1204, a saturation dynamic is performed on the result of step 1202, a ramp rate 1232, and the result of passing the ramp rate 1232 through gain step 1203. The output of step 1204 is then passed to step 1206 where it and the delayed current setpoint 816 are added. As shown in FIG. 12, the delayed current setpoint 816 added in step 1206 may reflect a unit delay calculated in step 1208.

At this point, the output of step 1206 is passed to step 1210 where a delta function is performed on the output and renewable generation 806 (i.e., wind generation in the example shown in FIG. 12). The delta from step 1210 is then passed to step 1228 where control logic is applied to the delta, a calibration switch 1212, and a constant 1220 (i.e., 0 in the example of FIG. 12) in order to produce the regulation signal 1224 (i.e., a wind regulation signal in the example shown in FIG. 12).

By employing various embodiments of the methods discussed above with reference to FIGS. 8-12, the Set Point Autopilot algorithm allows energy storage devices with limited amounts of energy available to provide a type of set point regulation for an intermittent renewable generation technology without the need for manual intervention. It also allows the energy storage device to use its renewable generation regulation capability to control the state of charge of the device by charging and discharging from the renewable generator instead of from the grid.

Fixed Signal Bias Algorithm

Some customers, regional transmission markets and power pools use a performance evaluation methodology that affects payment and future ability to continue providing services in that market, so any SOC control solution must consider its effect on overall unit performance. Accordingly, a problem is how to bias the signal without violating the performance methodology so as to allow the regulating unit to get the highest performance score it is capable of achieving.

One aspect of some performance evaluation methodologies involves a maximum allowed average deviation from the regulation signal. For example, the value can be 5 MW, and it could change in the future. In an embodiment, the fixed bias algorithm operates as follows:

When the system state of charge is below 45% the bias amount is equal to or slightly less than the maximum allowed bias amount (5 MW, in our example above), and this amount is subtracted from the regulation signal.

When the system state of charge is above 55% the bias amount is equal to or slightly less than the maximum allowed bias amount (5 MW, in our example above), and this amount is added to the regulation signal.

In all other cases the bias amount is zero and the regulation signal is not biased.

The maximum bias amount can be set equal to:

The maximum allowed average deviation according to rules established by the system operator, Less than the maximum allowed deviation according to the system operator's rules in order to cover system deviations due to auxiliary load and other factors.

In embodiments, the state of charge limits (45% and 55% in the above example) can be set to different values to allow the user more control over the state of charge. For example, a user can tighten control over the state of charge by creating a smaller 'window' for the desired range of state of charge (e.g., by using 49% and 51%). The user can loosen control over the state of charge by creating a larger window for the desired range of the state of charge (e.g., by using 40% and 60%). The user can also move the desired state of charge to a different value by specifying a range around that value (e.g., by using values of 35% and 45% the user will be trying to keep the state of charge around 40%).

Current bias algorithms can be used to detect when certain conditions are occurring (overheating, becoming empty or full, for example) and may be able to add or subtract a bias amount from the regulation signal to make it less onerous while the condition is in effect. However, in certain markets and regions that have a performance scoring mechanism, it is possible to lower the performance score with the wrong bias algorithm. This would have an adverse impact on revenues and possibly the future viability of the project in that market. The fixed bias algorithm allows to user to apply the maximum bias to the signal to control the state of charge without affecting the performance score.

Operational Limits Algorithm

Under certain circumstances lithium ion batteries can exhibit a sudden loss of output voltage. This has been observed in lithium ion-based energy storage devices when there is a high throughput, battery temperatures increase beyond some threshold, and a high discharge rate is driving the state of charge down rapidly. The result is that the state of charge will drop suddenly, without warning, from some value between 5% and 30% to zero. The algorithm described below can be added to a control program that will reduce or eliminate the likelihood that this will occur.

This Operational Limits algorithm has been tested and proven to be effective in eliminating voltage collapse in lithium ion batteries. One method of controlling this behavior involves foldbacks, or derates. In algorithms using foldbacks or derates, the discharge signal is reduced in steps or according to a continuous function as the state of charge drops below 20% and approaches zero. The problem of voltage collapse in lithium ion batteries has been observed, however, from states of charge as high as 25 or 30%. It is also sudden and occurs without warning. This solution incorporates several factors known to be associated with voltage collapse and intercepts the discharge signal only when those conditions exist.

In accordance with an embodiment, the modification can consist of an algorithm, such as the method 1300 shown in FIG. 13, that moves toward a desired set point at a user-defined rate. When method 1300 illustrated in FIG. 13 is implemented, the output from the energy storage device will appear to 'ramp' from one set point to the next.

Method 1300 begins in step 1302 and proceeds to step 1304 where the difference, or delta, between the current setpoint of the unit and the desired signal is calculated. After the calculation, control is passed to step 1306.

In step 1306, a determination is made as to whether the difference calculated in step 1304 is less than a user-defined step size (e.g., a max step size) or not. If the difference is less than the max step size, then control is passed to step 1310 where the difference is added to the setpoint. Otherwise, if the difference is greater than a user-defined step size then control is passed to step 1308 where the max step size is added to the setpoint.

Next, in step 1312, a determination is made as to whether the current signal has a different sign than the previous signal or not. If it does, then control is passed to step 1314 where the setpoint is set to zero. This is an important part of the method 1300 because the zero output point and subsequent ramping from this point can provide immediate relief from heat buildup in energy storage devices and units. Otherwise, control is passed to step 1316.

In step 1316, a check is made to see if one of three flags or conditions is in effect: batteries are empty, batteries are full, and the signal is zero. In embodiments, these three conditions all have special signal handling characteristics that need to be preserved. If none of these three flags or conditions are set, control is passed to step 1320, where the method 1300 ends. Otherwise, if any one of these conditions or flags is in effect, then control is passed to step 1318 where the incoming signal remains unchanged. The result of executing step 1318 is that the method 1300 ignores all previous calculations (e.g., in steps 1304-1314) and passes the incoming signal through unchanged to step 1320 where the method 1300 ends.

Example Interface for Displaying Charge Derates

FIG. 14 depicts an exemplary graphical user interface (GUI) 1400 for displaying charge derates and foldbacks. As shown in FIG. 14, foldbacks 1426, including charge SOC, discharge SOC, and temperature foldbacks can be displayed in the GUI 1400 relative to SOC values 1402 across time durations 1404 (hours in the example of FIG. 14). By selecting, using an input device (not shown), one of the plurality of drop down menus 1412, 1416, and 1418, check boxes 1422 and 1424, a user can select a start time 1410 (i.e., starting from midnight on Feb. 8, 2011 in the example shown in FIG. 14) and an end time 1420 (i.e., to midnight on Feb. 9, 2011 in the example shown in FIG. 14) to display a graph of derates and foldbacks 1426.

Signal Bias Range Maintaining Algorithm

Some system operators may design performance scoring mechanisms that specify that an ancillary service provider should respond to a signal within some sort of tolerance band, as a function of the value of the signal, the amount of time it takes to respond to the signal, or both. SOC control algorithms that rely on signal biasing must take account of these types of performance scores so that they can control SOC and maintain a high performance score.

For example, an ISO or other grid operator may maintain a performance score based on the percent of time that the signal response falls between the maximum and minimum signal values over the previous 30 seconds. Some grid operators may have a second performance score specific to energy storage devices that gives a maximum score to those devices that maintain a state of charge between 33% and 66% of capacity. Employing the exemplary signal bias Range maintaining techniques disclosed herein will enable a unit/asset operator to meet both of these goals while also maximizing revenues.

As shown in FIG. 15, the state of charge can be divided into a plurality of bands 1500 including five bands. With reference to FIG. 15, the top band 1512 (SOC>97%) represents a condition where the batteries are nearly or substantially full.

FIG. 16 provides flowcharts illustrating methods 1600 and 1650 for maintaining a signal bias range in accordance with exemplary embodiments.

As shown in FIG. 16, with the exemplary method 1600, if the state of charge ends up in band 1512, then the batteries are nearly full. In step 1602, an incoming regulation signal is received. In this case when the batteries are substantially full, the MDU will issue a 0 (zero) revised signal in step 1606 regardless of the incoming regulation signal until the signal turns positive (as determined in step 1604), which would be a discharge signal, such as the signal out shown in step 1608. In accordance with an embodiment, it is expected that the auxiliary load will gradually reduce the state of charge naturally while it is waiting.

With reference to FIG. 15, if the state of charge ends up in band 1514 (55%<SOC<97%), then it is above the desired range but the batteries are not yet full. Much of this range results in lower capacity sales, which affects revenues. A goal of this part of the algorithm is to restore the state of charge to at least the lower end of this range if not the desired range below it. With reference to procedure 1700 of FIG. 17, in an embodiment, this is accomplished by:

a.) Keeping 30 seconds of past regulation signals in step 1702;
b.) Finding the highest and lowest values over those past 30 seconds in step 1704;
c.) Calculating the range between the highest and lowest values as part of step 1704, and;
d.) Selecting either the regulation signal or the highest value minus 10% of the range, whichever is higher (see, e.g., the selection Signal out in step 1704 of procedure 1700).

Selecting a value from the high end of the range ensures that the maximum amount of bias is used to either lower the state of charge or keep it from rising as fast as it otherwise would without violating a performance index.

If the state of charge ends up in the third band (45%<SOC<55%) then it is in the desired range and the regulation signal is passed through without any changes.

With continued reference to FIG. 15, if the state of charge ends up in the fourth band, band 1518 (3%<SOC<45%) then it is below the desired range but the batteries are not yet empty. Much of this range also results in lower capacity sales. The goal of this part of the algorithm is the same as band 1514, above, but in reverse. With reference to FIGS. 15 and 17, the goal is to move the state of charge toward the higher end of this range if not to the desired range above it. This is accomplished by:

a.) Keeping 30 seconds of past regulation signals in step 1702 of procedure 1750;
b.) Finding the highest and lowest values over those past 30 seconds in step 1706;
c.) Calculating the range between the highest and lowest values as part of step 1706, and;
d.) Selecting either the regulation signal, or the lowest value plus 10% of the range, whichever is lower in step 1706 (see, e.g., the selection of the Signal out in step 1706 of procedure 1750).

Selecting a value from the low end of the range ensures that the maximum amount of bias is used to either raise the state of charge or keep it from falling as fast as it otherwise would without violating the Performance Index.

In an embodiment, with reference to FIG. 15, if the state of charge ends up in the last band, band 1520 (that is, when the SOC is less than 3%), then the batteries are nearly or substantially empty. With reference to FIGS. 15 and 16, if the state of charge ends up band 1520, a method 1650 begins in step 1612, and then a small charge signal can be issued in step 1616 to gradually raise the state of charge of the batteries until the signal reverses and turns negative (as determined in step 1614), at which point, control is passed to step 1618 and it will resume normal operation.

Typical bias algorithms do not take into consideration the rules and regulations governing performance scoring in the regional transmission markets and power pools. As a result, these algorithms can degrade the performance score of the energy storage unit they are governing. The algorithm described above calculates a bias factor as well but it constrains the factor to be within the limits permitted by the performance scoring rules. As a result it will not degrade the performance score of the energy storage unit and will allow it to achieve the highest score it is capable of.

Recharge Feedback Loop

FIG. 18 is a block diagram depicting a recharge feedback loop 1800 for responding to a regulation signal 1806 according to a specified ramp rate. The exemplary recharge feedback loop 1800 can also restore a Generator step-up (GSU) transformer of a hybrid power plant to a desired GSU SOC 1830.

As shown in FIG. 18, the recharge feedback loop 1800 responds to a regulation signal 1806, which is passed to both a thermal output 1804 and a GSU output 1808. The recharge feedback loop 1800 consists of the thermal output 1804 being passed to the GSU output 1808, which is in turn evaluated against the desired GSU SOC 1830. Based on that evaluation, it is determined if a GSU makeup charge 1802 needs to be applied to the thermal output 1804 to restore the GSU transformer to the desired GSU SOC 1830.

Intelligent Algorithm Selection System and Method

The algorithms and methods discussed in the previous sections are primarily all-purpose algorithms designed to perform well over a wide range of conditions, while also staying within the constraints of market-based MTRs and the capabilities of battery-based energy storage devices. The next generation of algorithms will focus on optimal performance over a narrower range of conditions. These conditions could include different levels of signal intensity (such as those shown in FIG. 19), partial derates due to equipment failure, an overall system design that mixes different batteries or inverters with different characteristics, or other external conditions that can affect the performance of the energy storage device.

For example, FIG. 19 depicts an exemplary display 1900 of conditions where regulation signals of varying intensity, as measured in kilowatts 1902, can occur in a given duration 1904. As shown in FIG. 19, a less intense signal 1928 can occur during a range of time within the duration 1904 (i.e., one day in the example of FIG. 19), and a more intense signal 1930 can occur during another range of time in that same duration 1904.

The development of next-generation algorithms will require an overall framework or methodology such as that shown in FIGS. 20 and 21 that will, in effect, run many different algorithms simultaneously and automatically select the best algorithm for the current state of the system.

The current state of the system can be measured along many dimensions and could include the characteristics of the incoming signal, the temperature of the batteries and the inverters, the state of charge of the batteries, the battery voltage, and possibly the current price of the service being provided, among other things.

FIG. 20 shows the major components of an Intelligent Algorithm Selection system 2000. This system 2000 uses inputs 2060 such as, but not limited to, real-time data on the incoming signal, the state of charge of the batteries, battery cell and inverter temperatures, current market prices, system capacity currently on line, current system output, and other items. These data are inputs 2060 to a set of algorithm simulation models 2064 that run in real time and produce output responses 2066 unique to each algorithm and a set of component scores 2066 that measure the performance of each algorithm modeled by the algorithm simulation models 2064 along several dimensions of interest, such as estimated cell temperature, estimated inverter temperature, estimated system state of charge, among other things.

These scores 2066 are used by the score selection module 2068. In an embodiment, the score selection module 2068 implements a methodology that prioritizes the component scores 2066 according the current state of the system 2000. For example, if system temperatures are running high then the score selection module 2068 would assign a higher priority to algorithms modeled by the algorithm simulation models 2064 that suppress heat generation. If the signal intensity is relatively small and market prices are high, then the score selection module 2068 might assign a higher priority to algorithms that have smaller bias factors.

Once the algorithm with the highest score has been identified, the score selection module 2068 sends the response 2070 associated with that algorithm to the energy storage system, and that algorithm becomes the current working algorithm until a different algorithm is selected and takes its place.

A block diagram of a single-algorithm model is shown in FIG. 20. The bias algorithm 2164 is the first component of the exemplary model 2100, which receives inputs 2060 such as, but not limited to, real-time data on the incoming signal, the SOC of the batteries, and battery cell and inverter temperatures. Whereas previous algorithms had to be designed to perform well under a wide range of conditions, this algorithm 2164 can be designed to perform well under a more specific condition and would only become active when that condition occurs.

This algorithm 2164 will interact with a system simulator 2174 configured to simulate the energy storage system, by simulating additions and withdrawals 2172 of energy from the batteries and will estimate various properties such as heat output from the various components, auxiliary load losses, round trip losses, and other factors. In an embodiment, a score keeping module 2178 will compute a component score 2066 for each relevant property of the algorithm 2164.

There can be any number of individual algorithms incorporated in this methodology. There could, for example, be a general-purpose algorithm that is used most of the time and a number of specific algorithms that become active under particular circumstances. This would allow more optimal performance under a wider range of conditions than has previously been possible.

Example Computer Implementation

Although exemplary embodiments have been described in terms of algorithms, methods or an apparatus, it is contemplated that it may be implemented by microprocessors of a computer, such as the computer system 2200 illustrated in FIG. 22. In various embodiments, one or more of the functions of the various components may be implemented in software that controls a computing device, such as computer system 2200, which is described below with reference to FIG. 21. The processor(s) of the computer system are configured to execute the software recorded on a non-transitory computer-readable recording medium, such as a hard disk drive, ROM, flash memory, optical memory, or any other type of non-volatile memory.

Aspects of the present disclosure shown in FIGS. 1-21, or any part(s) or function(s) thereof, may be implemented using hardware, software modules, firmware, tangible computer readable media having instructions stored thereon, or a combination thereof and may be implemented in one or more computer systems or other processing systems.

FIG. 22 illustrates an example computer system 2200 in which embodiments of the present disclosure, or portions thereof, may be implemented as computer-readable code. For example, the methods illustrated in the flowcharts of FIGS. 7, 13, and 16 can be implemented in computer system 2200 using hardware, software, firmware, non-transitory computer readable media having instructions stored thereon, or a combination thereof and may be implemented in one or more computer systems or other processing systems. Hardware, software, or any combination of such may embody any of the modules and components used to implement the system and components of FIGS. 1, 3, 4, 5A, 5B, 8-12, 18, 20 and 21. If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, mini-computers, mainframe computers, computers linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor 'cores.'

Various embodiments of the present disclosure are described in terms of this example computer system 2200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 2204 may be a special purpose or a general purpose processor device. As will be appreciated by persons skilled in the relevant art, processor device 2204 may also be a single processor in a multi-core/multiprocessor system, such system operating alone, or in a cluster of computing devices operating in a cluster or server farm. Processor device 2204 is connected to a communication infrastructure 2206, for example, a bus, message queue, network, or multi-core message-passing scheme.

The computer system 2200 may also include a display interface 2202 and a display 2230. In certain embodiments, the display interface 2202 and the display 2230 can be configured to render the user interfaces, graphs, and charts of FIGS. 6, 14, and 19 discussed above.

The computer system 2200 also includes a main memory 2208, for example, random access memory (RAM), and may also include a secondary memory 2210. Secondary memory 2210 may include, for example, a hard disk drive 2212, removable storage drive 2214. Removable storage drive 2214 may comprise a floppy disk drive, a magnetic tape drive, an optical disk drive, a flash memory, or the like.

The removable storage drive 2214 reads from and/or writes to a removable storage unit 2218 in a well-known manner. Removable storage unit 2218 may comprise a floppy disk, magnetic tape, optical disk, etc. which is read by and written to by removable storage drive 2214. As will be appreciated by persons skilled in the relevant art, removable storage unit 2218 includes a non-transitory computer usable storage medium having stored therein computer software and/or data.

In alternative implementations, secondary memory 2210 may include other similar means for allowing computer programs or other instructions to be loaded into computer system 2200. Such means may include, for example, a removable storage unit 2222 and an interface 2220. Examples of such means may include a program cartridge and cartridge interface (such as that found in video game devices), a removable memory chip (such as an EPROM, or PROM) and associated socket, and other removable storage units 2222 and interfaces 2220 which allow software and data to be transferred from the removable storage unit 2222 to computer system 2200.

The computer system 2200 may also include a communications interface 2224. Communications interface 2224 allows software and data to be transferred between computer system 2200 and external devices. Communications interface 2224 may include a modem, a network interface (such as an Ethernet card), a communications port, a PCMCIA slot and card, or the like. Software and data transferred via communications interface 2224 may be in the form of signals, which may be electronic, electromagnetic, optical, or other signals capable of being received by communications interface 2224. These signals may be provided to communications interface 2224 via a communications path 2226. Communications path 2226 carries signals and may be implemented using wire or cable, fiber optics, a phone line, a cellular phone link, an RF link or other communications channels.

In this document, the terms 'computer program medium,' 'non-transitory computer readable medium,' and 'computer usable medium' are used to generally refer to media such as removable storage unit 2218, removable storage unit 2222, and a hard disk installed in hard disk drive 2212. Signals carried over communications path 2226 can also embody the logic described herein. Computer program medium and computer usable medium can also refer to memories, such as main memory 2208 and secondary memory 2210, which can be memory semiconductors (e.g., DRAMs, etc.). These computer program products are means for providing software to computer system 2200.

Computer programs (also called computer control logic) are stored in main memory 2208 and/or secondary memory 2210. Computer programs may also be received via communications interface 2224. Such computer programs, when executed, enable computer system 2200 to implement the present disclosure as discussed herein. In particular, the computer programs, when executed, enable processor device 2204 to implement the processes of the present disclosure, such as the stages in the methods and procedures illustrated by the flowcharts 700, 1300, 1600, 1650, 1700 and 1750 of FIGS. 7, 13, 16, and 17 discussed above. Accordingly, such computer programs represent controllers of the computer system 2200. Where the present disclosure is implemented using software, the software may be stored in a computer program product and loaded into computer system 2200 using removable storage drive 2214, interface 2220, and hard disk drive 2212, or communications interface 2224.

Embodiments of the present disclosure also may be directed to computer program products comprising software stored on any computer useable medium. Such software, when executed in one or more data processing device, causes a data processing device(s) to operate as described herein. Embodiments of the present disclosure employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.), and communication mediums (e.g., wired and wireless communications networks, local area networks, wide area networks, intranets, etc.).

CONCLUSION

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

The above description of exemplary embodiments has been presented for the purposes of illustration and description. They are not intended to be exhaustive or to limit the invention to the precise form described, and many modifications and variations are possible in light of the foregoing teachings. The embodiments are described to explain the principles of the invention and its practical applications to thereby enable others skilled in the art to utilize the invention in various embodiments and with various modifications as are suited to the particular use contemplated.

What is claimed is:

1. A method for controlling a state of charge (SOC) of an energy storage device in an energy system, the method comprising:
receiving, at a processor device, a regulation signal for the energy storage device, the processor device being configured to execute a polynomial function; and
the processor device:
determining a current SOC of the energy storage device;
scoring the regulation signal based on an amount of heat produced in the energy storage device and based on the rate of change of the regulation signal;
converting the current SOC of the energy storage device to a current SOC index for use in the polynomial function;
obtaining a polynomial bias factor by invoking the polynomial function based on a score of the regulation signal, the current SOC index of the energy storage device, and real power of the energy storage device;
controlling the energy storage device so that the current SOC is within a desired SOC range in response to the received regulation signal and in accordance with the polynomial bias factor; and
adjusting the polynomial function dynamically based on characteristics of the regulation signal.

2. The method of claim 1, wherein the polynomial function is a 7th order polynomial function.

3. The method of claim 2, wherein for converting the current SOC to create a current SOC index:
the current SOC index ranges from −1 to +1;
the polynomial bias factor ranges from −100% to +100% of a maximum bias amount; and
the energy storage device is:
substantially empty when the current SOC index is about −1.0;
about half full when the current SOC index is 0; and
substantially full when the current SOC index is about 1.0.

4. The method of claim 3, wherein scoring the regulation signal comprises:
creating a first differences score for the regulation signal ranging from 0 to 1, where a first differences score of 0 represents a regulation signal that seldom changes and a first differences score of 1 represents a regulation signal that changes by a larger amount more often;
creating a threshold score for the regulation signal ranging from 0 to 1, wherein a threshold score of 0 represents a regulation signal that is very strongly positive or negative most of the time and a threshold score of 1 represents a regulation signal that is not strongly positive or negative most of the time; and
averaging the first differences score and the threshold score to create a composite score ranging from 0 to 1, wherein a composite score of 0 represents a regulation signal that is less positive or negative most of the time and changes often, and a composite score of 0 represents a regulation signal that is very strongly positive or negative most of the time and seldom changes,
wherein the polynomial function is dynamically adjusted based on the composite score to alter the way the polynomial bias factor is calculated.

5. The method of claim 4, wherein the polynomial function is $y=3.35*n*(x^3)-3.35*n*(x^5)+(x^7)$, where:
n is the composite score; and
$x=2*SOC-1$, where SOC is the current SOC of the energy storage device and the value x is the current SOC index of the energy storage device.

6. The method of claim 1, further comprising:
identifying regulation signal characteristics that may:
overheat the energy storage device;
cause the energy storage device to become full; or
cause the energy storage device to become empty; and
dynamically adjusting the polynomial function to provide a smaller or larger polynomial bias factor, depending on the characteristics of the signal.

7. The method of claim 1, wherein the energy storage device provides frequency regulation or intermittent renewable regulation services to the energy system in accordance with the regulation signal.

8. The method of claim 1, further comprising servicing the regulation signal in accordance with certain minimum technical requirements (MTRs) associated with an Independent System Operator (ISO), a Regional Transmission Organization (RTO), a power pool, or an operator of an electric grid associated with the energy system.

9. The method of claim 1, wherein the desired SOC range reflects equipment requirements for the energy storage device, and operations parameters associated with an operations plan for the energy storage device.

10. The method of claim 1, wherein the energy system supplies power to a regional power utility, a power pool, or a Regional Transmission Organization (RTO).

11. A method for adjusting a rate of change of an output of a variable energy generation source in an energy system including an energy storage device, the method comprising:
receiving, at a processor device of the energy storage device, a regulation signal, the processor device being configured to execute a polynomial function; and
at the processor device:
determining, a current SOC of the energy storage device and a current setpoint of the variable energy generation source;
scoring the regulation signal based on an amount of heat produced in the energy storage device and based on the rate of change of the regulation signal;
converting the current SOC of the energy storage device to a current SOC index for use in the polynomial function;
calculating, at a processor device of the energy system, a state of charge (SOC) bias factor for the energy storage device based on a score of the regulation signal, the current SOC index of the energy storage device, and the current setpoint of the variable energy generation source;
calculating a moving average of energy output from the variable energy generation source over a time period;
calculating an indicated setpoint based on the moving average and the SOC bias factor;
receiving a ramp rate indicating desired rate of change of output for the variable energy generation source;
calculating a current set point based on the indicated setpoint, a unit delay of the variable energy generation source, the ramp rate, and current generation output of the variable energy generation source;
comparing the current set point to the indicated set point;
determining, based on the comparing, whether the current set point needs to be changed; and
moving the current set point toward the indicated set point at the ramp rate when it is determined that the current set point needs to be changed.

12. The method of claim 11, further comprising:
transmitting a regulation signal to the energy storage device representing the difference between the current set point and the current generation output of the variable energy generation source; and
maintaining a total output of the variable energy generation source at a fixed amount by charging or discharging the energy storage device in accordance with the set point regulation signal.

13. The method of claim 12, wherein the variable energy generation source is an intermittent, renewable energy resource.

14. The method of claim 13, wherein:
the variable energy generation source is a wind energy resource or a solar energy resource;
the current generation output is current wind generation or current solar generation; and
the regulation signal is a wind or solar regulation signal.

15. The method of claim 11, wherein the ramp rate can be either an increase or a decrease of power output of the variable energy generation source.

16. The method of claim 11, wherein the time period for calculating the moving average is related to an energy capacity of the energy storage device such that the time period is longer for an energy storage device with a relatively high energy capacity and the time period is shorter for an energy storage device with a relatively low energy capacity.

17. The method of claim 11, further comprising updating the indicated setpoint to a combined value of the moving average and the SOC bias factor in response to determining that a difference between the combined value and the indicated set point exceeds a defined threshold value.

18. A system for controlling a state of charge (SOC) and responsiveness of an energy storage device to a regulation signal to be within a specified tolerance, the system comprising:
a processor; and
a memory storing control logic, which when executed by the processor, the processor performs operations comprising:
storing, in a storage device, 30 seconds of the regulation signal as past regulation signals;
identifying the highest and lowest values of the past stored regulation signals over the 30 seconds;
calculating a range that is the difference between the highest and lowest values of the past stored regulation signals;
selecting from the higher of:
(a) a current value of the regulation signal, and
(b) the highest value of the past stored regulation signals minus 10% of the range; and
adjusting the SOC of the energy storage device based on a result of the selecting from the higher of (a) and (b).

19. The system of claim 18, wherein the specified tolerance of the SOC of the energy storage device comprises a plurality of bands of SOC values including:
SOC values greater than 97%;
SOC values greater than 55% and less than or equal to 97%;
SOC values greater than 45% and less than or equal to 55%;
SOC values greater than 3% and less than or equal to 45%; and
SOC values less than or equal to 3%.

20. The system of claim 18, wherein the specified tolerance is one or more of:
a function of a value of the regulation signal; and
an amount of time it takes for the energy storage device to respond to the regulation signal.

21. A non-transitory computer readable storage medium having instructions stored thereon that, in response to execution by a computing device, cause the computing device to perform operations for maintaining a state of charge (SOC) for an energy storage device supplying power to an electric grid, the operations comprising:
determining a maximum allowed average deviation from a regulation signal associated with the electric grid;
in response to determining that the SOC of the energy storage device is above a maximum SOC limit:
setting an SOC bias amount equal to or slightly less than a maximum SOC bias amount; and
adding the SOC bias amount to the regulation signal; and
in response to determining that the SOC is equal to or below a minimum SOC limit, setting the SOC bias amount to zero,
wherein the maximum SOC bias amount is:
a maximum allowed average deviation according to a minimum technical requirement (MTR) of an operator of the electric grid; or
less than a maximum allowed deviation according to an MTR in order to cover system deviations due to auxiliary load and other factors.

22. The non-transitory computer readable storage medium of claim 21, wherein the maximum and minimum SOC limits are adjustable.

23. The non-transitory computer readable storage medium of claim 21, wherein the maximum SOC limit is 55% and the minimum SOC limit is 45%.

24. The non-transitory computer readable storage medium of claim 21, wherein the operator of the electric grid is an Independent System Operator (ISO) or a Regional Transmission Organization (RTO).

25. A system for controlling a state of charge (SOC) of an energy storage device configured to supply power to an electric grid, the system comprising:
at least one power generator configured to generate power, the at least one power generator being connected to the electric grid and being coupled to the energy storage device;
an SOC receiver configured to receive a regulation signal, and indications of a current SOC and a desired SOC of the energy storage device;
an SOC bias calculator configured to:
score the regulation signal based on an amount of heat to be produced in the energy storage device and on a rate of change of the regulation signal;
convert the current SOC of the energy storage device to a current SOC index;
invoke a polynomial function to calculate an SOC bias factor based at least on the score of the regulation signal and the current SOC index of the energy storage device;
a controller configured to adjust, based on the SOC bias factor, the SOC of the energy storage device to be within a desired SOC range.

26. A non-transitory computer readable storage medium having instructions stored thereon that, in response to execution by a computing device, cause the computing device to perform operations for controlling a state of charge (SOC) of an energy storage device configured to supply power to an electric grid, the operations comprising:
- determining a current SOC of the energy storage device;
- receiving a regulation signal and an indication of a desired SOC of the energy storage device;
- scoring the regulation signal based on an amount of heat to be produced in the energy storage device and on the rate of change of the regulation signal;
- converting the current SOC of the energy storage device to a current SOC index;
- invoking a polynomial function to calculate a bias factor based at least on the score of the regulation signal and the current SOC index of the energy storage device; and
- adjusting, based on the bias factor and in accordance with the regulation signal, the SOC of the energy storage device to be within a desired SOC range.

27. The non-transitory computer readable storage medium of claim 26, wherein the regulation signal is received from an operator of the electric grid.

* * * * *